(12) United States Patent
Cartwright et al.

(10) Patent No.: US 9,182,126 B2
(45) Date of Patent: Nov. 10, 2015

(54) SIGNATURE COOKING

(75) Inventors: Richard W. Cartwright, Piqua, OH (US); Richard A. Kice, Tipp City, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 271 days.

(21) Appl. No.: 13/274,624

(22) Filed: Oct. 17, 2011

(65) Prior Publication Data

US 2013/0092680 A1 Apr. 18, 2013

(51) Int. Cl.
*H05B 6/64* (2006.01)
*H05B 11/00* (2006.01)
*F24C 7/08* (2006.01)
*H05B 6/68* (2006.01)

(52) U.S. Cl.
CPC ............... *F24C 7/08* (2013.01); *H05B 6/6435* (2013.01); *H05B 6/6473* (2013.01); *H05B 6/687* (2013.01)

(58) Field of Classification Search
CPC .......... H05B 6/64; H05B 11/00; A47J 27/62; A47J 37/06; A47J 37/08; A47J 43/14
USPC ............ 99/332, 497, 468, 401; 219/620–627, 219/678–682
See application file for complete search history.

(56) References Cited

U.S. PATENT DOCUMENTS

| | | | | |
|---|---|---|---|---|
| 4,317,977 A | * | 3/1982 | Buck | 219/709 |
| 4,613,739 A | * | 9/1986 | Richards | 219/718 |
| 5,945,018 A | * | 8/1999 | Halen | 219/492 |
| 6,486,453 B1 | * | 11/2002 | Bales et al. | 219/702 |
| 6,528,772 B1 | * | 3/2003 | Graves et al. | 219/680 |
| 6,750,433 B2 | | 6/2004 | Guenther et al. | |

(Continued)

FOREIGN PATENT DOCUMENTS

| | | |
|---|---|---|
| CN | 101506584 A | 8/2009 |
| CN | 201697184 U | 1/2011 |

(Continued)

OTHER PUBLICATIONS

International Search Report and Written Opinion of corresponding International Application No. PCT/US2012/059909 mailed Apr. 5, 2013.

*Primary Examiner* — Dana Ross
*Assistant Examiner* — Michael Laflame, Jr.
(74) *Attorney, Agent, or Firm* — Nelson Mullins Riley & Scarborough LLP

(57) ABSTRACT

An oven includes a cooking chamber configured to receive a food product, a user interface configured to display information associated with processes employed for cooking, first and second energy sources, and a cooking controller. The first energy source provides primary heating and the second energy source provides secondary heating for the food product. The cooking controller executes instructions directing application of energy to the food product via the first or second energy sources. The cooking controller may include processing circuitry configured to receive an indication of cooking parameters defining at least a food product category of the food product and select a cooking signature corresponding to the food product category. The cooking signature may include information descriptive of inherent properties of the food product category and input response properties defining one or more sets of instructions associated with a cooking sequence for the food product based on the cooking parameters.

20 Claims, 28 Drawing Sheets

(56) References Cited

U.S. PATENT DOCUMENTS

| | | |
|---|---|---|
| 6,809,301 B1 | 10/2004 | McIntyre et al. |
| 6,914,226 B2 * | 7/2005 | Ottaway ............ 219/775 |
| 6,936,801 B1 | 8/2005 | Head |
| 7,069,091 B2 | 6/2006 | Williamson |
| 7,351,941 B2 | 4/2008 | Kim |
| 2003/0000947 A1 * | 1/2003 | Kim ............ 219/702 |
| 2006/0260601 A1 | 11/2006 | Schedeler et al. |
| 2006/0289438 A1 * | 12/2006 | Fraccon et al. ............ 219/401 |
| 2007/0235450 A1 * | 10/2007 | Quantrille et al. ............ 219/730 |
| 2008/0236562 A1 * | 10/2008 | Sager et al. ............ 126/273 R |
| 2008/0290087 A1 | 11/2008 | Ben-Shmuel et al. |
| 2009/0045191 A1 | 2/2009 | Ben-Shmuel et al. |
| 2009/0057302 A1 | 3/2009 | Ben-Shmuel et al. |
| 2009/0134141 A1 * | 5/2009 | Crosta et al. ............ 219/401 |
| 2009/0236333 A1 | 9/2009 | Ben-Shmuel et al. |
| 2009/0236334 A1 | 9/2009 | Ben-Shmuel et al. |
| 2009/0236335 A1 * | 9/2009 | Ben-Shmuel et al. ........ 219/710 |
| 2010/0006564 A1 | 1/2010 | Ben-Shmuel et al. |
| 2010/0006565 A1 | 1/2010 | Ben-Shmuel et al. |
| 2010/0187224 A1 * | 7/2010 | Hyde et al. ............ 219/720 |
| 2011/0017728 A1 | 1/2011 | Ben-Shmuel et al. |
| 2011/0031236 A1 | 2/2011 | Ben-Shmuel et al. |
| 2011/0031240 A1 | 2/2011 | Ben-Shmuel et al. |
| 2011/0033584 A1 | 2/2011 | Bilchinsky et al. |

FOREIGN PATENT DOCUMENTS

| | | |
|---|---|---|
| EP | 0255207 A2 | 2/1988 |
| EP | 1384951 A1 | 1/2004 |
| EP | 2211116 A1 | 7/2010 |
| EP | 2213175 A1 | 8/2010 |
| WO | 2005067639 | 7/2005 |
| WO | 2007103958 A2 | 9/2007 |
| WO | 2011100008 | 8/2011 |

* cited by examiner

Example Signature - Chicken Breast  ← 892

| | |
|---|---|
| Product Category | Protein |
| Sub Category | Poltry |
| Product Name | Chicken Breast |
| Portions | 6 |
| mass/portion | 200g |
| Doneness | N/A |
| Browning Temp | 220C |
| Browning Air | 2000 |
| Browning Start | 0 |
| Browning Stop | 33:20:00 |
| Estimated Cook Time | 33:20:00 |
| PPP | 75 |
| PPH | 100 |
| Start Temp | Chilled |
| Estimated Energy | 250kJ |
| $\lambda$ | 0.75 |
| $\tau$ | 0.0013 |
| c | 0δ782 |
| $\kappa$ | 6.52400E-07 |
| $\Theta$ | 0.104 |
| Cutoff | 2300 |
| $\varepsilon$ | 0.592 |

Example Signature – Bread

| | |
|---|---|
| Product Category | Baked Sub |
| Category | Breads |
| Product Name | Bread, loaf |
| Portions | 2 |
| mass/portion | 675g |
| Doneness | N/A |
| Browning Temp | 170 C |
| Browning Air | 2500 |
| Browning Start | 0 |
| Browning Stop | 30:35 |
| Estimated Cook Time | 30:35 |
| PPP | 100 |
| PPH | 50 |
| Start Temp | room |
| Estimated Energy | 258 kJ |
| $\lambda$ | 0.85 |
| $\tau$ | 0.0032 |
| c | 0δ601 |
| $\kappa$ | 5.26000E-07 |
| $\theta$ | 0.104 |
| Cutoff | 2300 |
| $\epsilon$ | 0.839 |

| Recipe Description | max/unit m (g) entry | count entry | m calc | Level selection | T entry | S entry | PPP default | PPH default | λ default | τ default | c default |
|---|---|---|---|---|---|---|---|---|---|---|---|
| PROTEIN | | | | | | | | | | | |
| poultry | 400 | 3 | 1200 | lower | 220 | 2500 | 75 | 100 | 0.75 | 0.0013 | 0 |
| meat | 200 | 9 | 1800 | lower | 180 | 2500 | 75 | 100 | 0.945 | 0.0019 | 0 |
| fish | 225 | 6 | 1350 | lower | 175 | 1500 | 75 | 100 | 0.665 | 0.0029 | 0 |
| shell fish | 75 | 10 | 750 | lower | 170 | 2000 | 75 | 100 | 0.75 | 0.002 | 0 |
| VEGETABLES | | | | | | | | | | | |
| veggies | 1000 | 1 | 1000 | upper | 170 | 2500 | 100 | 50 | 0.783 | 0.0024 | 0 |
| root | 175 | 12 | 2100 | lower | 250 | 3000 | 100 | 50 | 0.85 | 0.0035 | 0 |
| BAKED GOODS | | | | | | | | | | | |
| bread | 675 | 2 | 1350 | lower | 170 | 2500 | 100 | 50 | 0.85 | 0.0032 | 0 |
| cakes / batter | 1400 | 2 | 2800 | lower | 200 | 3500 | 100 | 50 | 0.725 | 0.0032 | 0 |

FIG. 24A

| κ default | ϴ default | cutoff default | P_IL,set calc | t_set point val | E_set point val | ε calc | δ*m (kJ) calc | E_tot vector | t_reset check | P_IL (watts) val | P_c (watts) val | t_set calc | E_set point calc |
|---|---|---|---|---|---|---|---|---|---|---|---|---|---|
| 6.5260E-07 | 0.104 | 2300 | 124.8 | 33.33 | 249.56 | 0.592 | 938.400 | 126 | 10 | 124.80 | 344.47 | 33.33 | 249.56 |
| 8.4840E-07 | 0.104 | 2300 | 187.2 | 22.16 | 248.94 | 0.914 | 1162.500 | 123 | 10 | 187.20 | 687.20 | 22.16 | 248.94 |
| 8.4990E-07 | 0.104 | 2300 | 140.4 | 17.90 | 150.76 | 0.652 | 646.650 | 129 | 10 | 140.40 | 461.81 | 17.90 | 150.76 |
| 1.7756E-06 | 0.104 | 2300 | 78 | 6.83 | 31.96 | 0.583 | 217.500 | 80 | 10 | 78.00 | 452.78 | 6.83 | 31.96 |
| 1.4090E-06 | 0.104 | 2300 | 104 | 12.54 | 78.26 | 0.712 | 619.000 | 88 | 10 | 104.00 | 718.59 | 12.54 | 78.26 |
| 5.3360E-07 | 0.104 | 2300 | 218.4 | 19.63 | 257.18 | 0.849 | 1247.400 | 154 | 10 | 218.40 | 840.89 | 19.63 | 257.18 |
| 5.2600E-07 | 0.104 | 2300 | 140.4 | 31.60 | 266.18 | 0.839 | 838.350 | 100 | 10 | 140.40 | 301.79 | 31.60 | 266.18 |
| 9.3820E-07 | 0.104 | 2300 | 240 | 13.54 | 194.96 | 0.725 | 1318.800 | 199 | 10 | 240.00 | 1383.48 | 13.54 | 194.96 |

FIG. 24B

δ-factors modification to adjust cooking time computation based on starting temperature & doneness selection

δ-factors for refrigerated, room temp, and frozen starting states ....

δ-factors

| | fridge temp (2 deg C) | room temp (20 deg C) | frozen (-15 deg C) |
|---|---|---|---|
| PROTEIN | | | |
| poultry | 782 | 730 | 1022 |
| meat | 646 | | |
| fish | 479 | 424 | 741 |
| shell fish | 290 | 266 | 403 |
| VEGETABLES | | | |
| veggies | 619 | 574 | 838 |
| root | 594 | 573 | 692 |
| BAKED GOODS | | | |
| bread | 621 | 601 | 714 |
| cakes / batter | 471 | 456 | 539 | see specific section: meat "slider" δ values meat "slider", δ values

| | | Starting Temp | |
|---|---|---|---|
| Doneness | Frig | Room | Frozen |
| rare (52 deg C) | 125 | 74 | 350 |
| med rare (57 deg C) | 293 | 242 | 518 |
| well done (74 deg C) | 862 | 811 | 1087 |

FIG. 25

SIGNATURE COOKING

TECHNICAL FIELD

Example embodiments generally relate to ovens and, more particularly, relate to an oven that is enabled to cook food with multiple energy sources based on employment of a cooking signature.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality.

As an example, microwave cooking may be faster than convection or other types of cooking. Thus, microwave cooking may be employed to speed up the cooking process, while another heat source may be used to achieve browning. Controlling an oven to employ some level of automation with regard to utilization of multiple heat sources or multiple stages of cooking has been undertaken by employing cooking programs that are sometimes referred to as "recipes". The programs or recipes typically define specific oven control instructions like time periods over which heat is to be applied using any of a variety of sources and the corresponding power levels of the equipment to be employed in connection with each of the sources. However, the programs or recipes are typically static in nature and the programs execute in the same manner each time they are executed. Moreover, the programs or recipes are typically merely a recitation of steps, processes or ingredients that are generic in nature.

BRIEF SUMMARY OF SOME EXAMPLES

Some example embodiments may provide an oven that employs multiple cooking sources that are electronically controlled via processing circuitry. The cooking sources may be operated, under control of the processing circuitry, using a cooking signature that incorporates inherent properties of products to which the cooking signature applies in order to provide for dynamic control over various aspects of the cooking process. The processing circuitry may therefore provide the oven with the ability to monitor certain conditions and/or cooking parameters for changes and initiate control based on a cooking signature that is responsive to such changes based at least in part on the inherent properties of the product.

In one example embodiment, an oven is provided. The oven may include a cooking chamber, a user interface, a first energy source, a second energy source and a cooking controller. The cooking chamber may be configured to receive a food product. The user interface may be configured to display information associated with processes employed for cooking the food product. The first energy source may provide primary heating of the food product placed in the cooking chamber. The second energy source may provide secondary heating for the food product. The cooking controller may be operably coupled to the first and second energy sources to execute instructions directing application of energy to the food product via at least one of the first or second energy sources. The cooking controller may include processing circuitry configured to receive an indication of cooking parameters entered by an operator of the oven where the cooking parameters define at least a food product category of the food product and select a cooking signature corresponding to the food product category. The cooking signature may include information descriptive of inherent properties of the food product category and input response properties defining one or more sets of instructions associated with a cooking sequence for the food product based on the cooking parameters.

In another example embodiment, a cooking controller for use in an oven including a first energy source providing primary heating of a food product placed in the oven and a second energy source providing secondary heating for the food product is provided. The cooking controller may be operably coupled to the first and second energy sources to execute instructions directing application of energy to the food product via at least one of the first or second energy sources. The cooking controller may include processing circuitry configured to receive an indication of cooking parameters entered by an operator of the oven where the cooking parameters define at least a food product category of the food product and select a cooking signature corresponding to the food product category. The cooking signature may include information descriptive of inherent properties of the food product category and input response properties defining one or more sets of instructions associated with a cooking sequence for the food product based on the cooking parameters.

In another example embodiment, a method of controlling an oven including a first energy source providing primary heating of a food product placed in the oven and a second energy source providing secondary heating for the food product is provided. The method may include receiving an indication of cooking parameters entered by an operator of the oven where the cooking parameters define at least a food product category of the food product and selecting, via processing circuitry associated with a cooking controller operably coupled to the first and second energy sources, a cooking signature corresponding to the food product category. The cooking signature may include information descriptive of inherent properties of the food product category and input response properties defining one or more sets of instructions associated with a cooking sequence for the food product based on the cooking parameters.

Some example embodiments may improve the cooking performance and/or improve the operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 22 illustrates an example cooking signature for chicken breast with corresponding inherent property parameters according to an example embodiment;

FIG. 23 illustrates an example cooking signature for bread with corresponding inherent property parameters according to an example embodiment;

Figure 24C:
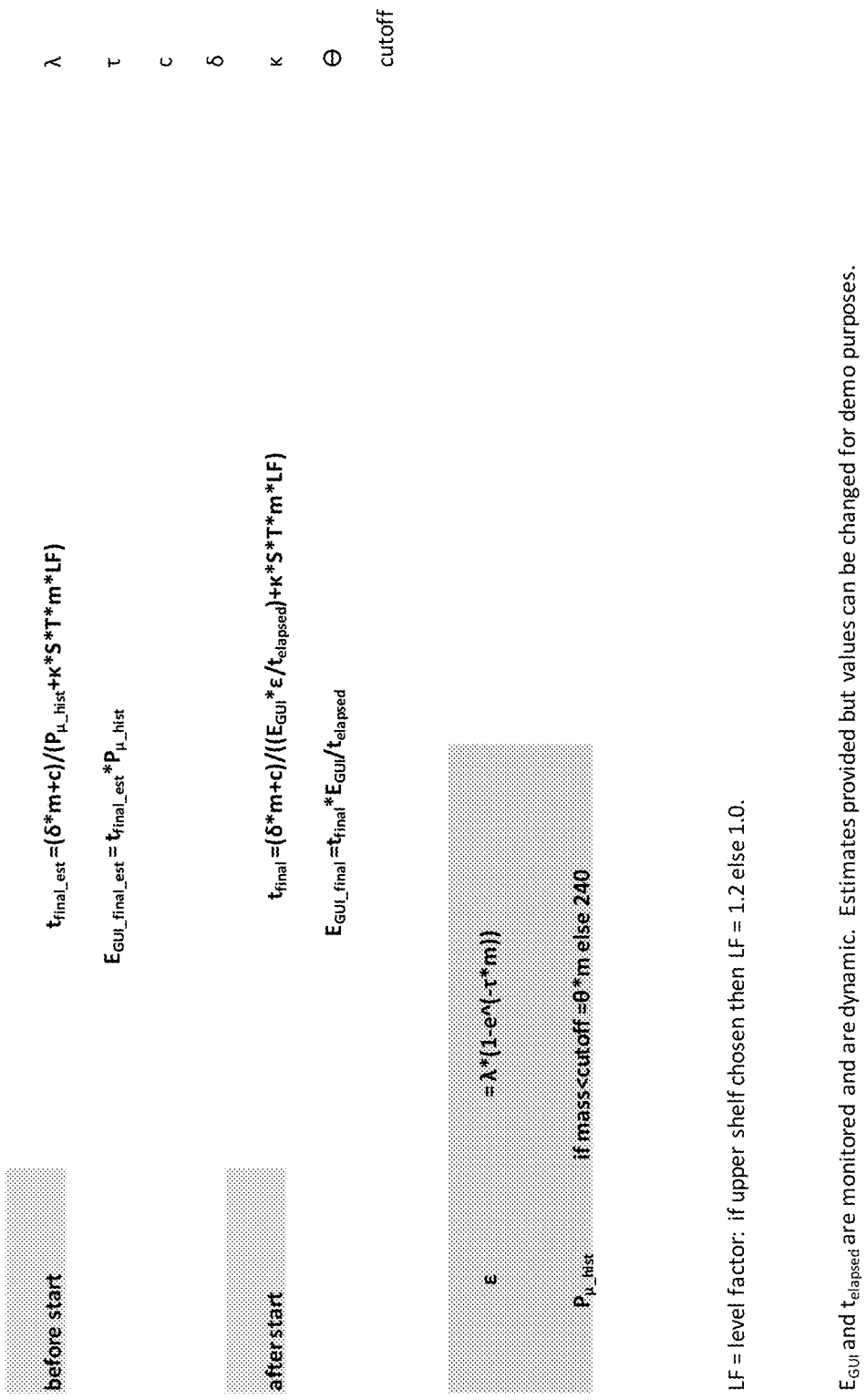
Figure 26:
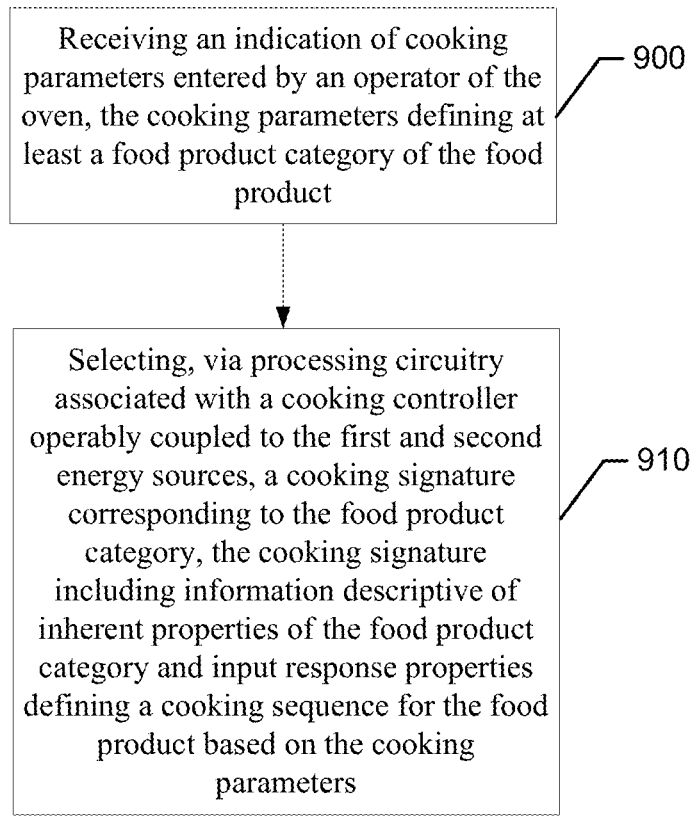

FIG. 24, which includes FIGS. 24A, 24B and 24C, illustrates an example detailed table providing values for computations utilized in connection with signature cooking according to an example embodiment;

FIG. 25 illustrates an example of modifications performed based on one inherent parameter ($\delta$) that may be provided for different food product types and initial conditions according to an example embodiment; and FIG. 26 illustrates a method according to an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Furthermore, as used herein the term "browning" should be understood to refer to the Maillard reaction or other desirable food coloration reactions whereby the food product is turned brown via enzymatic or non-enzymatic processes.

Some example embodiments may improve the cooking performance of an oven and/or may improve the operator experience of individuals employing an example embodiment. In this regard, since processing circuitry that controls the application of various energy sources can be used to account for inherent properties of food products using a cooking signature, the processing circuitry may be configured to dynamically account for changes to cooking parameters or other conditions. As such, the oven may have improved capabilities with respect to achieving a desired cooking result with increased accuracy and/or certainty. Thus, in some cases, a better cooked product may be achieved.

Figure 1:
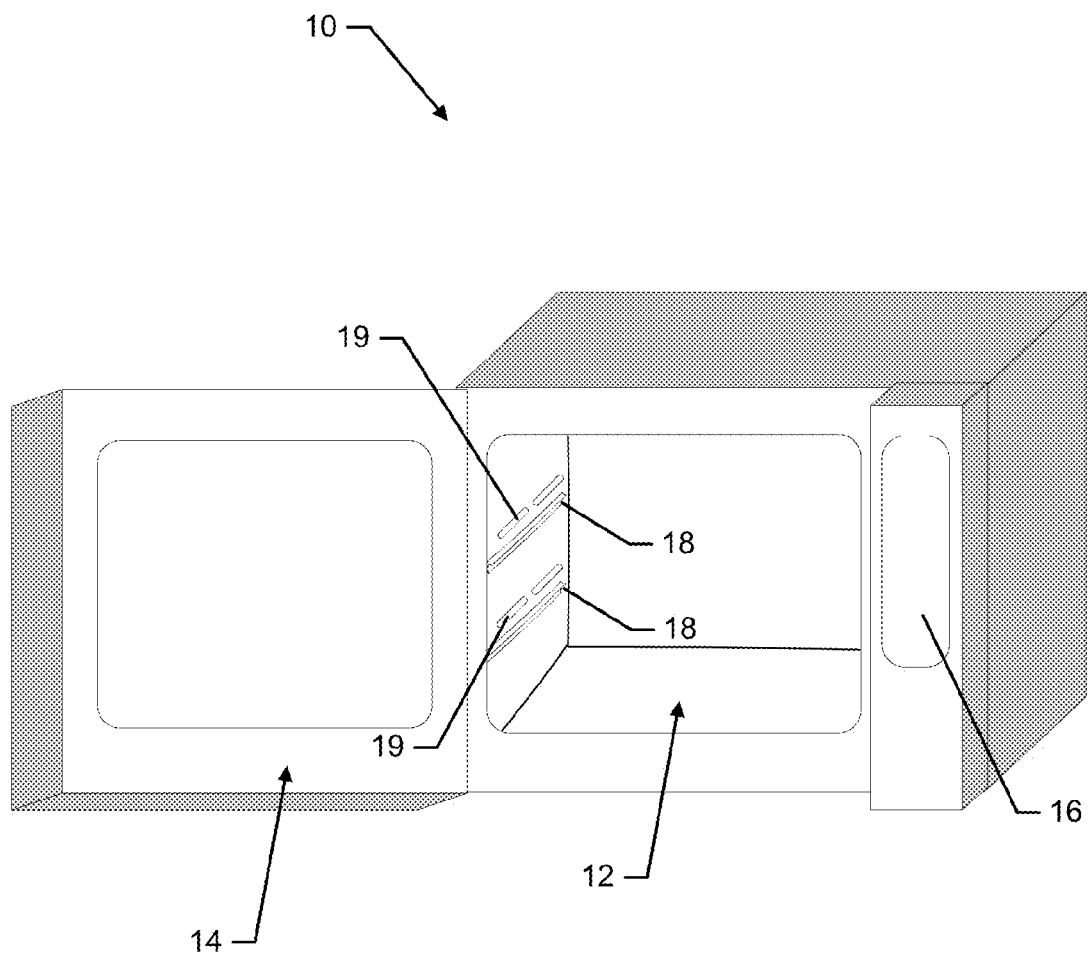
FIG. 1 illustrates a perspective view of an oven capable of employing at least two energy sources according to an example embodiment.

FIG. 1 illustrates a perspective view of an oven 10 according to an example embodiment. As shown in FIG. 1, the oven 10 may include a cooking chamber 12 into which a food product may be placed for the application of heat by any of at least two energy sources that may be employed by the oven 10. The cooking chamber 12 may include a door 14 and an interface panel 16, which may sit proximate to the door 14 when the door 14 is closed. In an example embodiment, the interface panel 16 may include a touch screen display capable of providing visual indications to an operator and further capable of receiving touch inputs from the operator. The interface panel 16 may be the mechanism by which instructions are provided to the operator, and the mechanism by which feedback is provided to the operator regarding cooking process status, options and/or the like.

In some embodiments, the oven 10 may include multiple racks or may include rack (or pan) supports 18 or guide slots in order to facilitate the insertion of one or more racks or pans holding food product that is to be cooked. In an example embodiment, airflow slots 19 may be positioned proximate to the rack supports 18 (e.g., above the rack supports in one embodiment) to enable air to be forced over a surface of food product placed in a pan or rack associated with the corresponding rack supports 18. Food product placed on any one of the racks (or simply on a base of the cooking chamber 12 in embodiments where multiple racks are not employed) may be heated at least partially using radio frequency (RF) energy. Meanwhile, the airflow that may be provided may be heated to enable browning to be accomplished as described in greater detail below.

Figure 2:
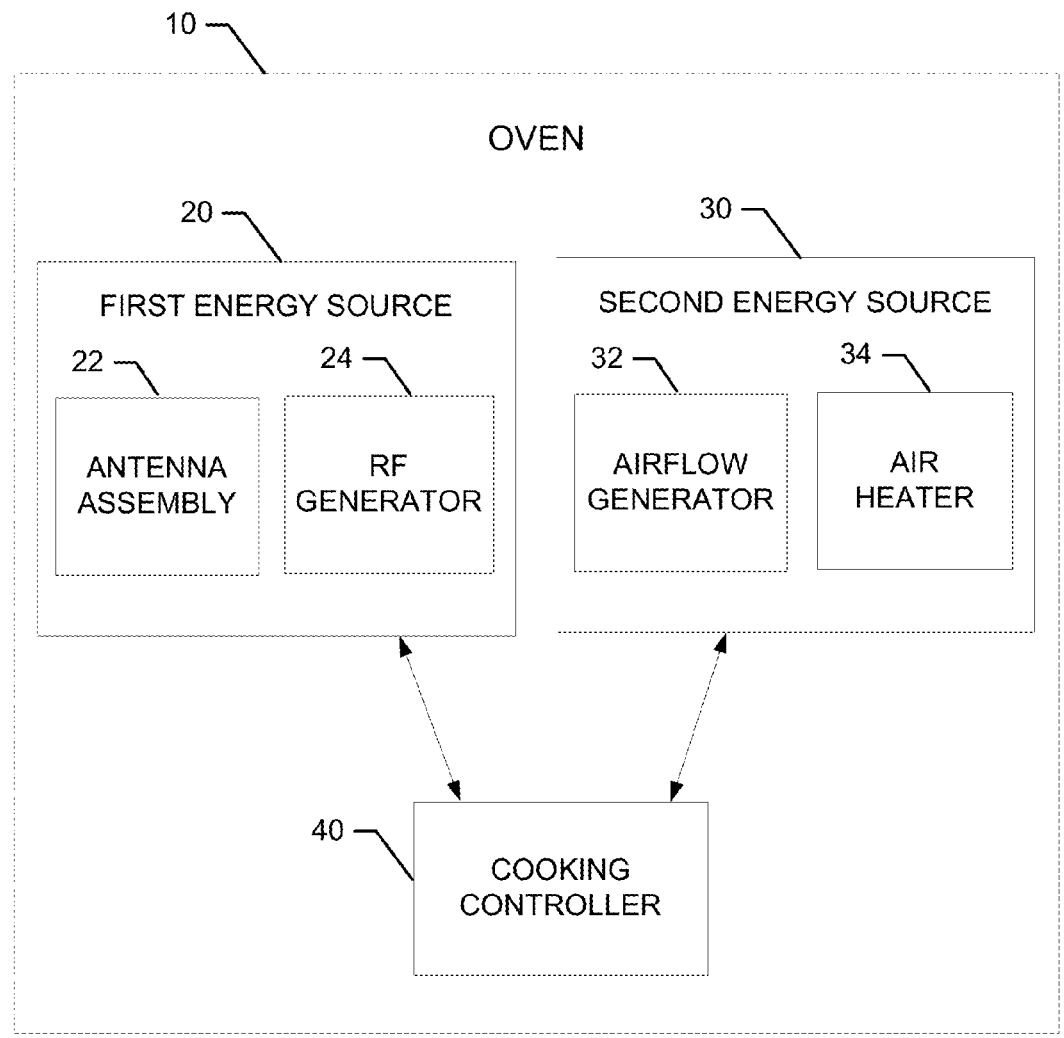
FIG. 2 illustrates a functional block diagram of the oven of FIG. 1 according to an example embodiment.

FIG. 2 illustrates a functional block diagram of the oven 10 according to an example embodiment. As shown in FIG. 2, the oven 10 may include at least a first energy source 20 and a second energy source 30. The first and second energy sources 20 and 30 may each correspond to respective different cooking methods. However, it should be appreciated that additional energy sources may also be provided in some embodiments.

In an example embodiment, the first energy source 20 may be an RF energy source configured to generate relatively broad spectrum RF energy to cook food product placed in the cooking chamber 12 of the oven 10. Thus, for example, the first energy source 20 may include an antenna assembly 22 and an RF generator 24. The RF generator 24 of one example embodiment may be configured to generate RF energy at selected levels over a range of 800 MHz to 1 GHz. The antenna assembly 22 may be configured to transmit the RF energy into the cooking chamber 12 and receive feedback to indicate absorption levels of respective different frequencies in the food product. The absorption levels may then be used, at least in part, to control the generation of RF energy to provide balanced cooking of the food product.

In some example embodiments, the second energy source 30 may be an energy source capable of inducing browning of the food product. Thus, for example, the second energy source 30 may include an airflow generator 32 and an air heater 34. The airflow generator 32 may include a fan or other device capable of driving airflow through the cooking chamber 12 and over a surface of the food product (e.g., via the airflow slots 19). The air heater 34 may be an electrical heating element or other type of heater that heats air to be driven over the surface of the food product by the airflow generator 32. Both the temperature of the air and the speed of airflow will impact browning times that are achieved using the second energy source 30.

In an example embodiment, the first and second energy sources 20 and 30 may be controlled, either directly or indirectly, by a cooking controller 40. The cooking controller 40 may be configured to receive inputs descriptive of the food product and/or cooking conditions in order to provide instructions or controls to the first and second energy sources 20 and 30 to control the cooking process. In some embodiments, the cooking controller 40 may be configured to receive both static and dynamic inputs regarding the food product and/or cooking conditions. Dynamic inputs may include feedback data regarding absorption of RF spectrum, as described above. In some cases, dynamic inputs may include adjustments made by the operator after or during the cooking process, or changing (or changeable) cooking parameters that may be measured via a sensor network. The static inputs may include parameters that are input by the operator as initial conditions. For example, the static inputs may include a description of the food type or category, initial state or temperature, final desired state or temperature, a number and/or size of portions to be cooked, a location of the item to be cooked (e.g., when multiple trays or levels are employed), and/or the like.

In some embodiments, the cooking controller 40 may be configured to access data tables that define RF cooking parameters used to drive the RF generator 34 to generate RF energy at corresponding levels and/or frequencies for corresponding times determined by the data tables based on initial condition information descriptive of the food product. As such, the cooking controller 40 may be configured to employ RF cooking as a primary energy source for cooking the food product. However, other energy sources (e.g., secondary and tertiary or other energy sources) may also be employed in the cooking process. In some cases, a cooking signature may be provided to define the cooking parameters to be employed for each of one or more cooking stages that may be defined for the food product and the cooking controller 40 may be configured to access and/or execute the cooking signature. In some embodiments, the cooking controller 40 may be configured to determine which portions of programs, subroutines, or recipes, which are associated with a corresponding cooking signature, to execute based on inputs provided by the user. In an example embodiment, an input to the cooking controller 40 may include any or all of information indicative of the category of food product, a desired doneness level, an initial state of the food product, mass of food product, number of portions of food product, location and/or secondary heating instructions such as browning instructions or other instructions that relate to the application of energy from a secondary energy source (e.g., the second energy source 30) and, in some cases, additional other energy sources. In this regard, for example, the browning instructions may include instructions regarding the air speed, air temperature and/or time of application of a set air speed and temperature combination. The browning instructions and other initial inputs may be provided via a user interface as described in greater detail below.

Based on the initial inputs defining cooking parameters (e.g., category of food product, a desired doneness level, an initial state of the food product, mass of food product, number of portions of food product, location and/or secondary heating instructions), a cooking signature may be selected for employment by the cooking controller 40. The cooking signature may include at least a description of inherent properties of the food product associated therewith. The inherent properties may describe, at least in part, parameters related to how the food product reacts or responds to certain cooking sources. For example, the cooking signature may include a description of parameters unique to RF energy absorption characteristics for the food product. In some cases, the cooking signature may further include information associated with or otherwise descriptive of a set of programs, subroutines or recipes that relate to a range of conditions related to the cooking parameters defined by the initial inputs and changes made thereto during a cooking process being executed for a certain food product or food product category. As such, the cooking signature is not merely a static list of instructions that are each to be executed and applicable only to a specific food product and corresponding set of initial conditions. Instead, the cooking signature defines at least inherent properties of the food product and input response properties. The input response properties may define various instructions that may be statically or dynamically implemented for a food product class (which in some cases may include only a single food product) based on corresponding initial inputs defining cooking parameters including, for example, a description of the food category or type, initial state or temperature, final desired state or temperature, a number and/or size of portions to be cooked, a location of the item to be cooked (e.g., when multiple trays or levels are employed), and/or the like. As such, in some cases, the input response properties may be related to the inherent properties given that the input response properties may define instructions to be executed based on current user inputs for the inherent properties of the food product.

In an example embodiment, an initial state and desired final state of the food product and/or based on changes to those initial inputs during the cooking process. Thus, each cooking signature may be associated with input response properties that relate to a range or combination of cooking parameters (e.g., including initial conditions and/or modifications thereto) that are applicable to the food product or food product class to which the cooking signature applies. Furthermore, the input response properties for each cooking signature may include corresponding instruction sets (e.g., defining cooking processes to be employed) that relate to each respective set, combination or category of cooking parameters within the range covered based on the corresponding inherent properties of the food product with which the cooking signature is associated. Based on the initial inputs, a cooking signature may be selected and the cooking signature may then govern the cooking process even in response to detection of some changes that are within the scope of the cooking signature being made during the cooking process. Responsive to such changes, the cooking controller 40 may simply execute different codes, programs, or subroutines associated with the cooking signature based on the changes made within the scope of the corresponding cooking signature. As such, a cooking signature may be a dynamic and broad scope recipe or cooking program that includes applicability or coverage of a plurality of different cooking parameters that may be set as initial conditions or modifications based on the inherent properties of the food product and the input response properties. Moreover, the cooking signature may include sets of code, programs or subroutines that cover various different cooking parameters so that one cooking signature may be applicable to different settings or modifications to settings that may be made by an operator.

Figure 3:
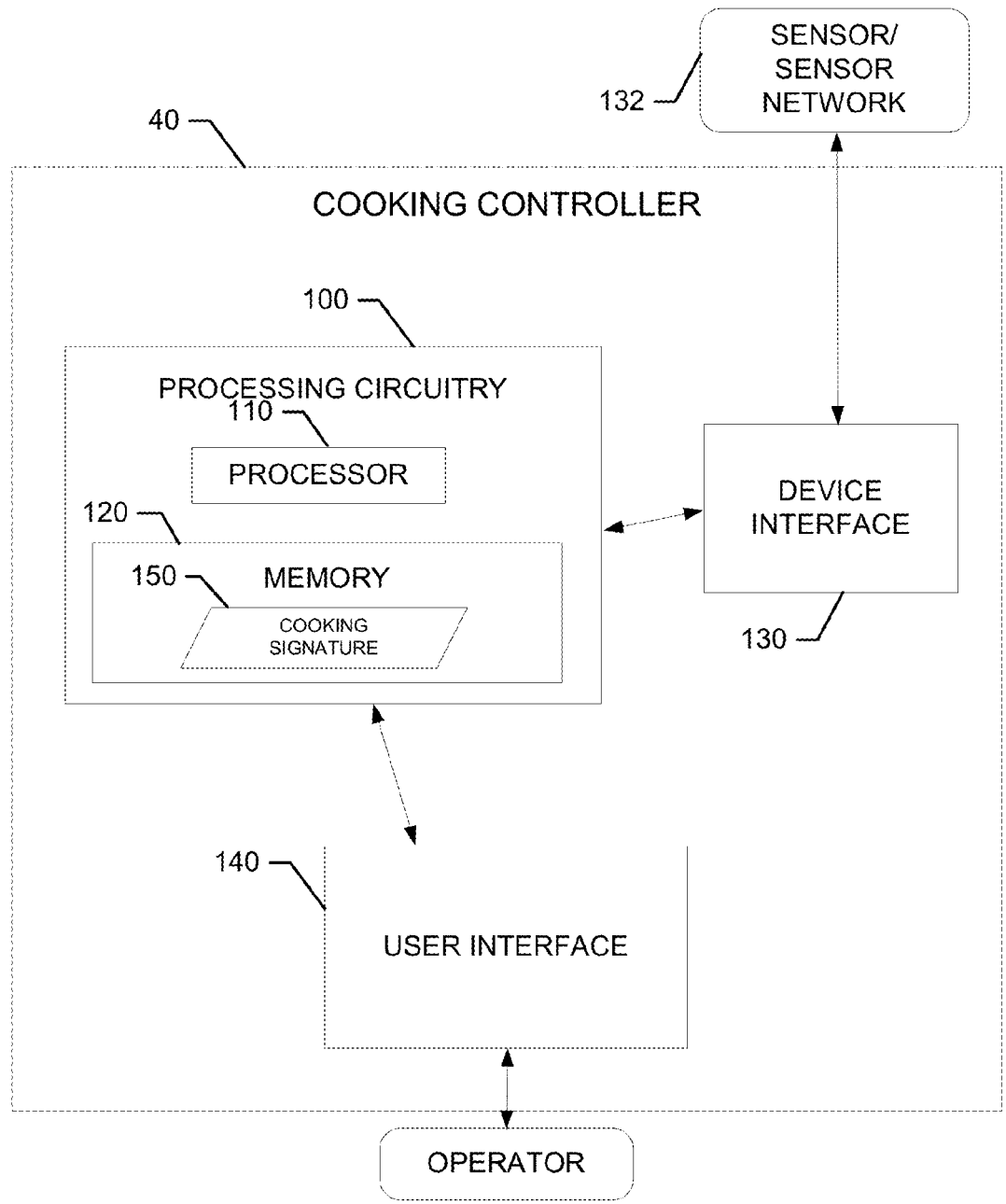
FIG. 3 illustrates a block diagram of a cooking controller according to an example embodiment.

FIG. 3 illustrates a block diagram of the cooking controller 40 according to an example embodiment. In some embodiments, the cooking controller 40 may include or otherwise be in communication with processing circuitry 100 that is configurable to perform actions in accordance with example embodiments described herein. As such, for example, the functions attributable to the cooking controller 40 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 100 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 100 may include a processor 110 and memory 120 that may be in communication with or otherwise control a device interface 130 and, a user interface 140. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of an on-board computer.

The user interface 140 (which may be embodied as, include, or be a portion of the interface panel 16) may be in communication with the processing circuitry 100 to receive an indication of a user input at the user interface 140 and/or to provide an audible, visual, mechanical or other output to the user (or operator). As such, the user interface 140 may include, for example, a display (e.g., a touch screen), one or more hard or soft buttons or keys, and/or other input/output mechanisms. In some embodiments, the user interface 140 may be provided on a front panel (e.g., positioned proximate to the door 14), on a portion of the oven 10.

The device interface 130 may include one or more interface mechanisms for enabling communication with other devices such as, for example, sensors of a sensor network (e.g., sensor/sensor network 132) of the oven 10, removable memory devices, wireless or wired network communication devices, and/or the like. In some cases, the device interface 130 may be any means such as a device or circuitry embodied in either hardware, or a combination of hardware and software that is configured to receive and/or transmit data from/to sensors that measure any of a plurality of device parameters such as frequency, temperature (e.g., in the cooking chamber 12 or in air passages associated with the second energy source 30), air speed, and/or the like. As such, in one example, the device interface 130 may receive input at least from a temperature sensor that measures the air temperature of air heated (e.g., by air heater 34) prior to introduction of such air (e.g., by the airflow generator 32) into the cooking chamber 12. In some cases, the sensor network 132 may also measure air speed directly (e.g., via pitot probes or other such devices) or indirectly (e.g., by recognizing fan speed or control signals applied to the airflow generator 32). Alternatively or additionally, the device interface 130 may provide interface mechanisms for any devices capable of wired or wireless communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the cooking controller 40 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets responsive to input from the sensor network 132, or responsive to programming of any of various cooking programs. Among the contents of the memory 120, applications may be stored for execution by the processor 110 in order to carry out the functionality associated with each respective application. In some cases, the applications may include control applications that utilize parametric data to control the application of heat or energy by the first and second energy sources 20 and 30 as described herein. In this regard, for example, the applications may include operational guidelines defining a plurality of sets of instructions for cooking food product for given initial parameters (e.g., food type, size, initial state, location, and/or the like) and any changes made thereto using corresponding tables of cooking data related to the first energy source 20 and the second energy source 30 applied over a variety of cooking parameters. Thus, for example, the applications may enable the selection of applicable instructions from a cooking signature to define RF heating characteristics to be used in connection with various air temperatures and air speeds based on initial conditions set by the operator while enabling different instructions to be selected from within the cooking signature responsive to any changes made to the initial conditions during the cooking process. Thus, the applications may execute signature cooking, which provides for dynamic response to oven control conditions based on inherent properties of the food product to be cooked and the input response properties by employing selected programs or subroutines from within a single cooking signature related to a particular food product or food product category. Thus, some applications that may be executable by the processor 110 and stored in memory 120 may include tables plotting air speed and temperature and/or RF heating characteristics for given food products or food product categories. In some cases, these tables may be further related to different selectable desired cooking temperatures (e.g., internal food temperatures), percentage of weight loss, or levels of doneness to describe a spectrum of possible cooking outcomes that may be achieved using a single cooking signature that enables selective employment of instructions associated therewith based on the cooking parameters defined by the operator (initially or dynamically during cooking) and the inherent properties of the food product.

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the cooking controller 40. As such, in some embodiments, the processor 110 (or the processing circuitry 100) may be said to cause each of the operations described in connection with the cooking controller 40 by directing the cooking controller 40 to undertake the corresponding functionalities responsive to execution of instructions or algorithms configuring the processor 110 (or processing circuitry 100) accordingly. As an example, the cooking controller 40 may be configured to control RF energy application based on air speed, temperature and/or the time of application of heat based on browning characteristics input at the user interface 140. In some examples, the cooking controller 40 may be configured to make adjustments to the RF energy to be added (or the time of application of such energy) based on operator adjustments made to the air temperature and/or air speed based on browning instructions selected. In other words, the cooking controller 40 may select applicable instructions from a library of instruction sets associated with a single cooking signature for a given food product or food product category based on the cooking parameters defined by the operator either initially or dynamically during cooking and the corresponding inherent parameters associated with the food product. Alternatively, the cooking controller 40 may be enabled to make adjustments to code selected for employment during the cooking process based on the adjustment of any or all of the controls associated with the first or second energy sources 20 or 30.

As such, in some example embodiments, the cooking controller 40 may be configured to determine, based on cooking parameters selected by an operator, a set of cooking instructions from a cooking signature associated with a particular food product or food product category. Moreover, the cooking controller 40 may be enabled to adjust to execution of a different set of cooking instructions responsive to any dynamic adjustments that are made to the cooking parameters. Thus, for example, if a cooking sequence is determined for cooking relative to energy applied by the first energy source 20 and the second energy source 30 (e.g., including time of application of energy sources and corresponding powers of application) based on selection of one or more programs associated with the cooking signature associated with the food product or food product category selected, where the one or more programs are selected based on the cooking parameters entered, and adjustments or inputs are made to direct changes to any of the cooking parameters, the cooking controller 40 may be configured to apply corresponding different selected programs in order to account for the adjustments or inputs and complete the cooking operation without overcooking/overheating or undercooking/under-heating the food product. The adjustments may be made based on the inherent properties of the food product (e.g., the food products specific response characteristics to specific types or combinations of energy sources) and the input response properties defined in the cooking signature in consideration of the inputs received.

In an example embodiment, shown in reference to FIG. 3, the cooking controller 40 may be configured to execute instructions to provide at least some control over the first and second energy sources 20 and 30 (and any additional energy sources that may be employed). In this regard, for example, the cooking controller 40 (e.g., via the processor 110 or the processing circuitry 100) may be configured to execute instructions associated with a cooking signature 150 that may be stored in the memory 120. The cooking signature 150 may include input response properties that define instructions or instruction sets that are correlated to specific user inputs defining cooking parameters (e.g., time, energy level, air temperature, frequency, air speed and/or the like) or ranges thereof for a given food product or food product category based on the inherent properties of the food product. The instructions or instruction sets may be selectable by the cooking controller 40 to be applied to food product to define a cooking sequence. As such, the cooking signature 150 may define a comprehensive set of instructions having applicability to a particular food product or food product category, where specific ones of the instructions or instruction sets are selectable by the cooking controller 40 based on initial operator selection of cooking parameters to define a cooking sequence that considers the inherent (and sometimes unique) properties of the food product relative to the user inputs that have been entered to indicate the operator's goals or desires for the cooking sequence. As such, the cooking signature 150 may further provide instructions or instruction sets for selectable execution responsive to any changes made to the initial cooking parameters given that the input response properties may define a different instruction set based on the inherent properties of the food product when certain inputs are received. Accordingly, the cooking signature 150 defines a comprehensive and dynamically adaptable set of instructions that may be used in connection with cooking a particular food product or food product category. The cooking signature 150 may also include notes that correspond to any particular instruction set. The notes may define specific relevant activities to be performed in association with the execution of a cooking sequence (e.g., flipping food product, removing food product from the oven for a period of time, and/or the like). The notes may also or alternatively include supplemental information such as ingredient listings, potential substitutions and/or the like.

In some embodiments, the cooking signature 150 may be previously installed in the memory 120. However, in other embodiments, the cooking signature 150 may be loaded into the memory 120 via wireless or wired communication with an external network or device. For example, the device interface 130 may be used to access the internet and a cooking signature or set of cooking signatures may be downloaded from the internet, again via a wired or wireless connection. Furthermore, in some embodiments, a removable memory device may be placed in communication with the cooking controller 40 to locally store cooking signatures or to enable access to cooking signatures.

As an example, in situations where the operator elects to provide control instructions to impact application of the second energy source 30 (e.g., to adjust the browning level), the initially selected instructions of the cooking signature 150, which were selected based on the initial cooking parameter entries made by the operator, may be departed from to select instructions that finish the food product appropriately in consideration of the different cooking parameters in light of the browning level adjustment.

In an example embodiment, the cooking controller 40 may also provide (e.g., via the user interface 140) the user with an intuitive interface for controlling cooking operations of the oven 10. FIGS. 4-15 illustrate various examples of control console or pop up screens of a user interface that may be employed by the cooking controller 40 according to an example embodiment. The options presented via the various screens presented may enable the operator to select from various presented options in order to define the initial cooking parameters, which may be displayed via a selection indicator ribbon that is built based on the selections made responsive to those options.

Figure 4:
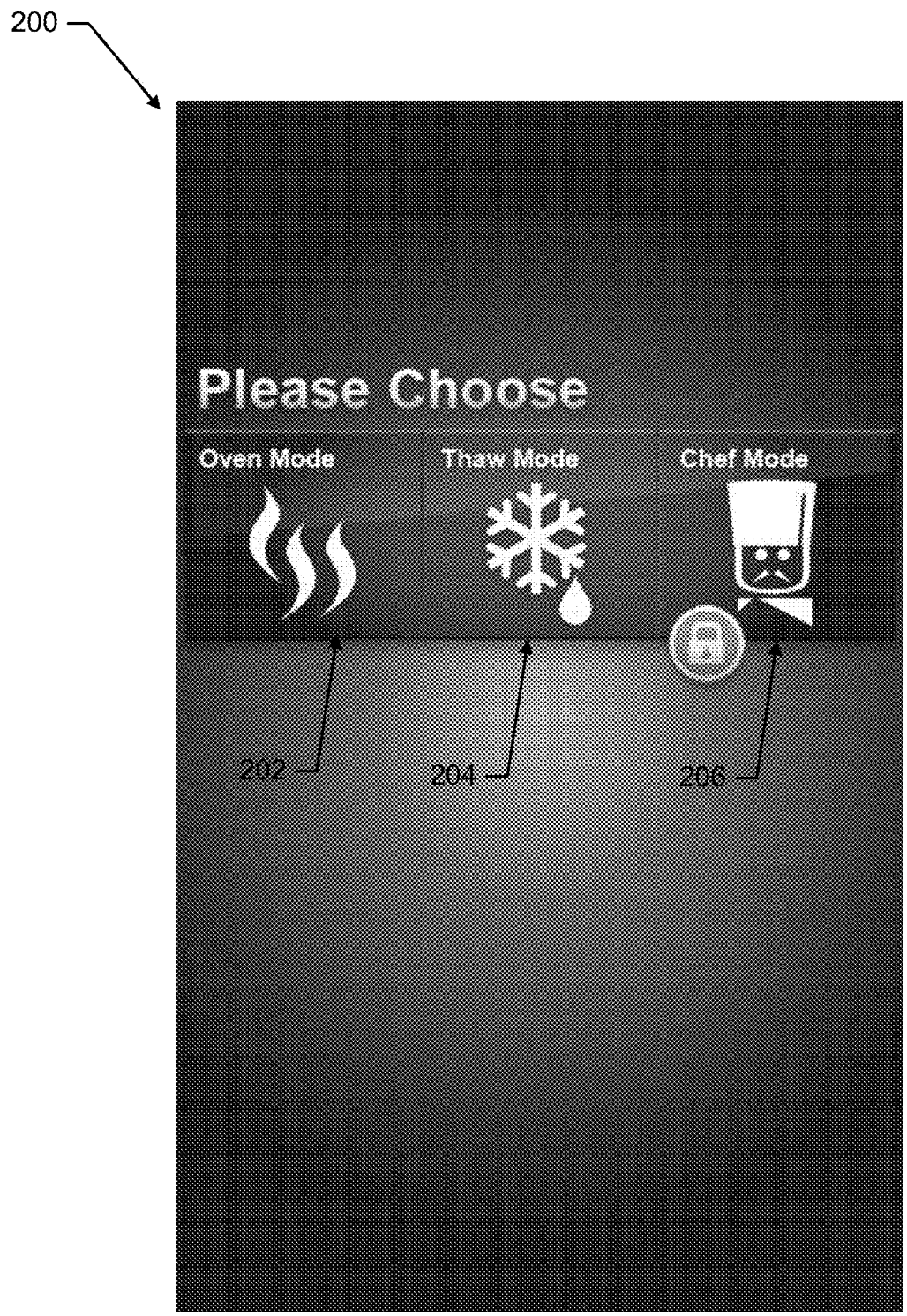
FIG. 4 illustrates a mode selection page presented on a user interface according to an example embodiment.

In some cases, operation of the oven 10 may be based at least in part on a mode selection option made by the user. In this regard, as shown in FIG. 4, the user interface 140 may present (e.g., responsive to direction by the processing circuitry 100) a mode selection page 200. The mode selection page 200 may provide a series of icons, tiles or graphical elements that are each associated with a different cooking mode of the oven 10. For example, an oven mode icon 202 may correspond to a first mode of operation (e.g., an oven mode), while a thaw mode icon 204 may correspond to a second mode of operation (e.g., a thawing mode), and a chef mode icon 206 may correspond to a third mode of operation (e.g., a chef mode). Each of the cooking modes may have corresponding different operational flow paths associated therewith. In this regard, for example, the thawing mode may be limited to operational flows and corresponding selectable options that are applicable to thawing operations. Meanwhile, the oven mode may have operational flows and corresponding selectable options that are applicable to cooking operations with a high level of automation to simplify the cooking process for the operator. However, the chef mode may have operational flows that correspond to more selectable options that give the operator enhanced or more detailed options for controlling cooking options. In other words, the chef mode may enable the operator to provide detailed cooking instructions via enhanced option provision in the operational flows that are provided therein. As such, for example, the chef mode may enable an operator to not only indicate cooking parameters for the selection of a cooking signature, but the chef mode may further give the operator options with regard to defining or modifying a cooking signature to at least some degree. However, in the oven mode, only existing signatures may be employed by automatic selection of corresponding cooking signatures to be executed based on the cooking parameters entered.

Figure 5:
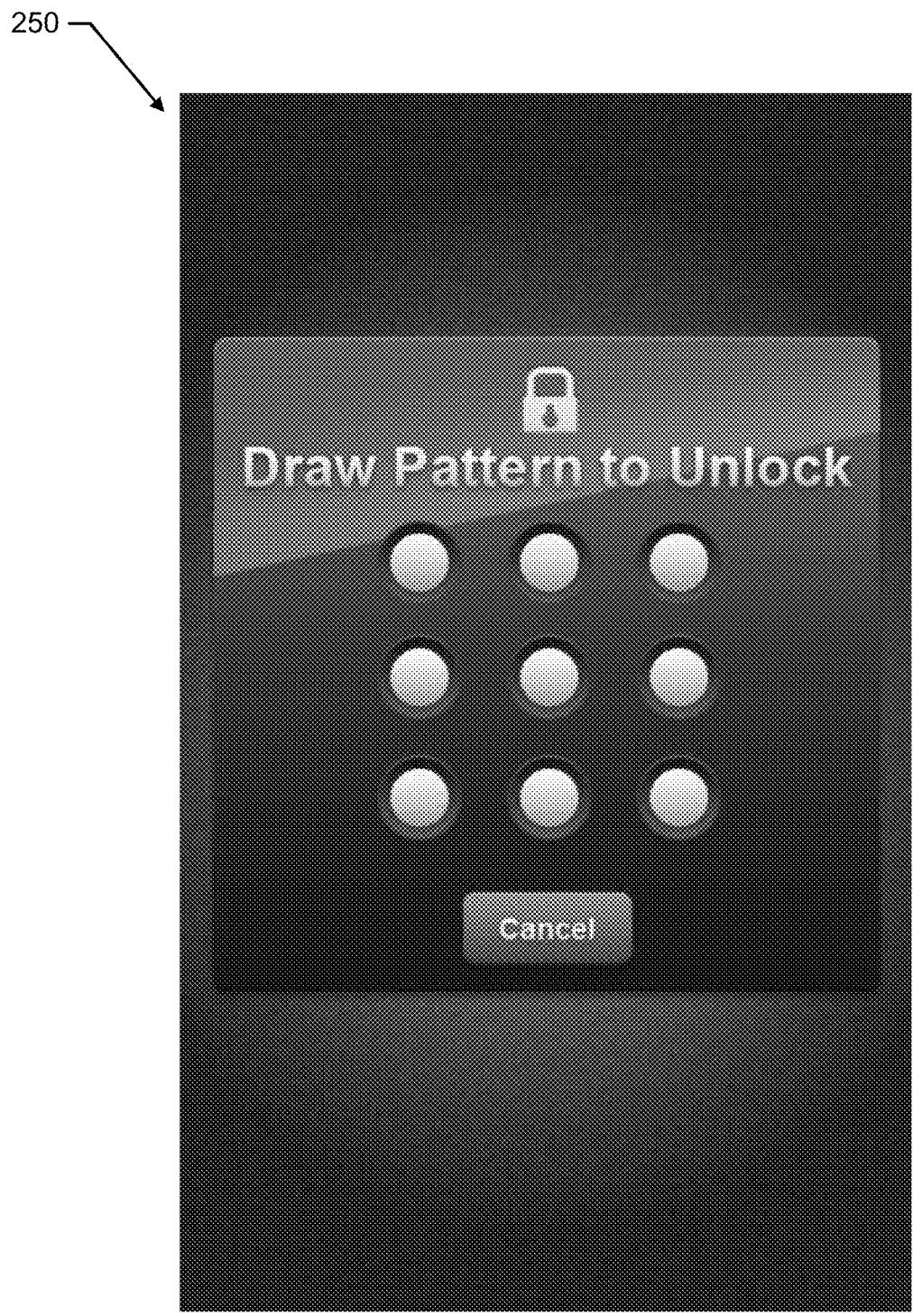
FIG. 5 illustrates an example of an unlock screen that may be presented in association with entering into the chef mode according to an example embodiment.

In some embodiments, the chef mode may be password protected, or otherwise require the operator to login or pass an authentication in order to enter. FIG. 5 illustrates an example of an unlock screen 250 that may be presented in association with entering into the chef mode. In this regard, the user may be asked to define a pattern initially to register, and thereafter the user may be required to produce the pattern in order to authenticate and enter the chef mode.

Given that the chef mode may provide more options than other modes due to enhanced automation or limited functionality requirements in other modes, an example embodiment employed in the context of the chef mode will be described in reference to FIGS. 6-15, but it should be understood that other and perhaps simpler modes of operation may also exist. However, example embodiments of the present invention may each provide for entry of cooking parameters via a series of entry pages having an updatable selection indication ribbon as described herein. In this regard, FIGS. 6-15 illustrate various views of cooking parameter entry pages that may be presented in order to enable an operator to select various cooking parameters via respective different pages. The cooking parameter entry pages may each enable the operator to enter information related to cooking parameters that will be used to cook food product placed in the oven 10 and they may be accessed sequentially while building a selection indicator ribbon. However, after a selection indicator ribbon has been built (or even when partially built), any one of the graphical elements defining selections previously made that are displayed in the selection indicator ribbon may be selected to immediately jump or link back to the corresponding cooking parameter entry page on which the cooking parameter that corresponds to the selected graphical element was provided so that changes can be made to the corresponding parameter. As indicated above, responsive to any changes, the cooking controller 40 may evaluate whether to change the specific instructions or sets of instructions being executed to define the cooking sequence for the food product.

Figure 6:
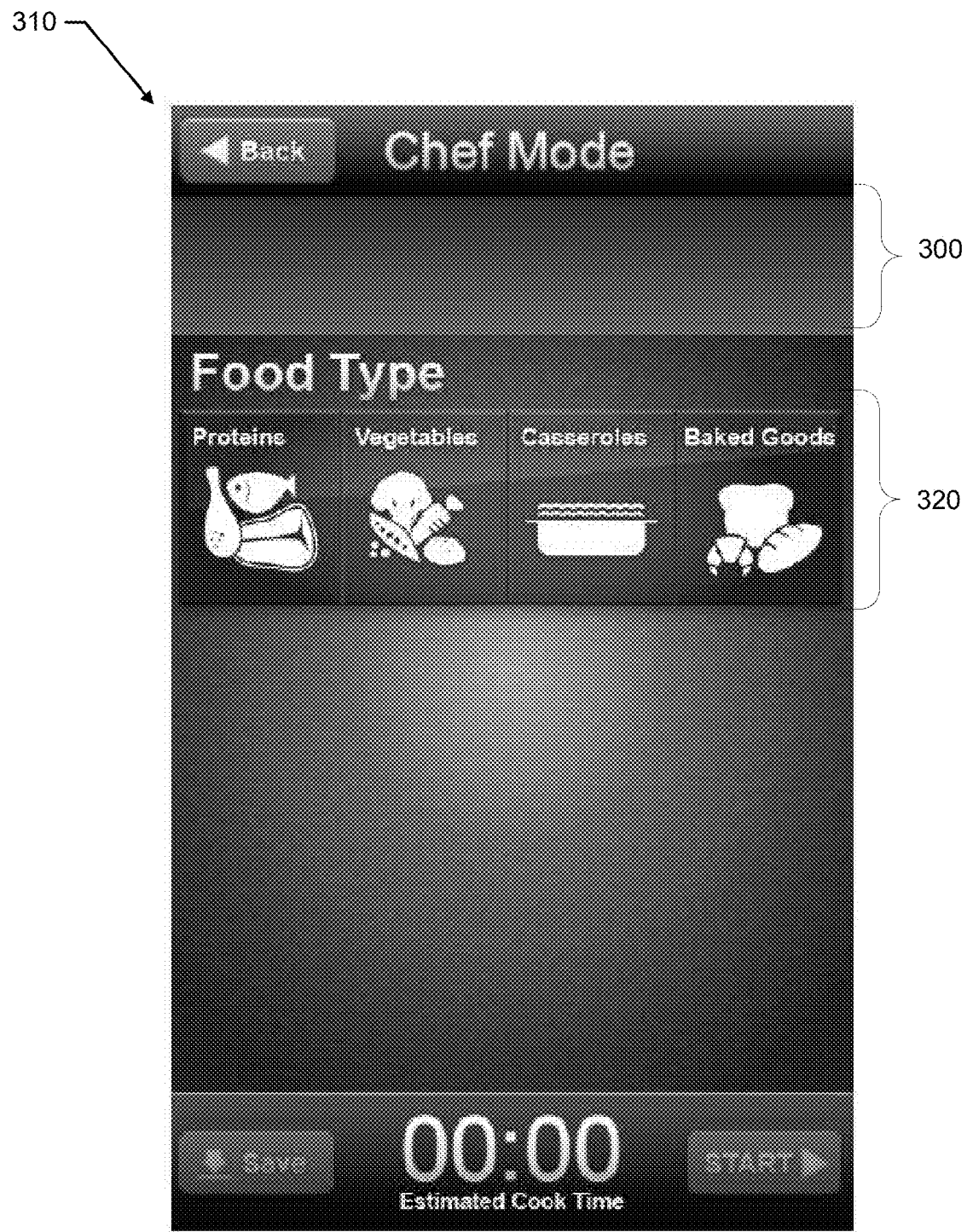
FIG. 6 illustrates an example screen for entry of cooking parameters according to an example embodiment.

FIG. 6 illustrates an example screen for entry of cooking parameters. In some embodiments, entry of cooking parameters may be provided via a plurality of individual entry screens, where each entry screen includes options for entry of one category of cooking parameter. Since there may be multiple cooking parameters entered prior to initiating a cooking operation, there may be corresponding multiple cooking parameter category-based entry pages. According example embodiments, each entry page may include a selection indicator ribbon 300 that shows selected options from all prior cooking parameter category-based entry pages. Given that the example of FIG. 6 is the first entry page, the selection indicator ribbon 300 does not yet include any selected options.

FIG. 6 illustrates an entry page 310 for entry of a selection of one food category or type option among a plurality of food categories or types with which the oven may operate. In this regard, a series of food category option tiles 320 (or icons) are provided as selectable graphical elements. The user may be enabled to select any one of the option tiles to designate the corresponding food category as a cooking parameter for use by the oven 10. By communicating the food category to the oven 10, the oven 10 may utilize the information for energy source selection. For example, the oven 10 (e.g., via the cooking controller 40) may select RF energy cooking parameters and/or combinations of other energy sources that may be appropriate to the corresponding food category selected. Thus, each food category option tile 320 may have corresponding data tables, recipes, or programs associated therewith and the selection of a specific option tile may enable the operator to be provided with programs that correspond to a relevant subset of the total population of tables, recipes or programs that are usable with the oven 10.

In some embodiments, the entry page 310 may indicate the current mode and may also provide navigation options such as a back button. The entry page 310 may generally also include save options and start options, but in some cases the save and/or start options may not be selectable until all cooking parameters have been entered. An estimated cook time may also be presented, but values may not be generated until all cooking parameters have been entered.

Figure 7:
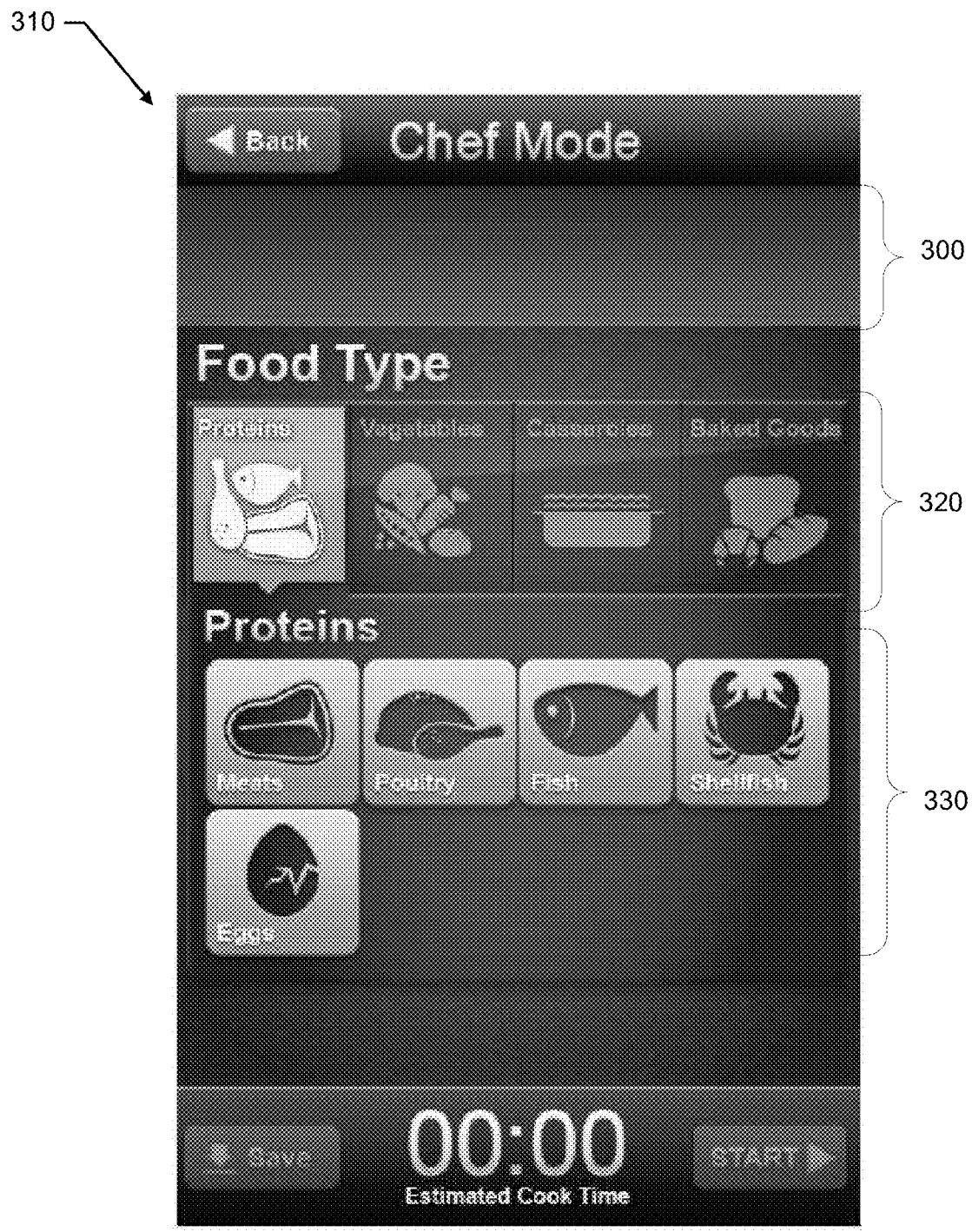
FIG. 7 illustrates an example in which subcategories within a protein main category group are provided to define finer categories of food categories that share cooking implementation guidelines and corresponding similar programming according to an example embodiment.

As shown in FIG. 6, one example embodiment may separate food category designations into main and sub-categories. In one example, the main categories may include proteins, vegetables, casseroles and baked goods. Each main category may have corresponding general cooking implementation guidelines associated therewith and therefore corresponding similar programming. However, within each main category, several subcategories may be further provided. For example, FIG. 7 illustrates an example in which subcategories within a protein main category group may also be provided to define finer categories of food types that share cooking implementation guidelines and corresponding similar programming. In this regard, for example, selection of a food category option tile 320 may generate a corresponding set of subcategory option tiles 330. The subcategory option tiles 330 for the protein main category group may include meats, poultry, fish, shellfish and eggs. Different cooking strategies may be employed within each respective subcategory.

For some subcategories, further cooking parameter information may be required that may be specific to the corresponding subcategory (or a set of subcategories). For example, if meat is selected, the initial state of the meat may need to be known. Initial state may be chilled (e.g., out of the refrigerator) or frozen (e.g., out of the freezer) in some cases and the initial state may provide information to the cooking controller 40 to determine how long (and perhaps also a method for use) to cook the food product. Meat (and perhaps some other subcategories) may be cooked differently dependent upon its initial state relative to being chilled or frozen. However, another subcategory (e.g., eggs) may not have initial states of chilled or frozen, but may instead have initial conditions that identify whether the egg is in its shell or removed therefrom. Thus, the initial conditions may be presented based on the subcategory selected. Cooking method options, some of which may be specific to certain food products or food product categories (e.g., food categories or subcategories), may also be selectable by the operator. In some cases, a doneness level may be specified. The operator may then enter information associated with the weight or mass of the food product being cooked, which may sometimes define a quantity of items to be cooked, a portion size, and/or a total weight of the food product. The operator may also select a location of the food product (e.g., based on the tray arrangement in the oven 10) and specific options for the application of one or more of the energy sources.

Figure 8:
FIG. 8 illustrates a screen shot of a page displayed when cooking operations have begun to indicate a final selection indicator ribbon along with a total estimated cook time according to an example embodiment.

With each entry, the selection indicator ribbon may be updated. FIG. 8 illustrates an example of an updated indicator ribbon 400 that may be presented responsive to selection of initial cooking parameters by the operator. In this example, the updated indicator ribbon displays a food product category 410 along with an indication of the initial state of the food product 412 and the desired doneness level 414. Information indicative of the mass of the food product 420 is provided along with an indication of food product location 430. Information indicative of second energy source employment 440 is also provided. Other information or different information than the example tiles shown in FIG. 8 may also or alternatively be provided in other example embodiments.

Figure 9:
FIG. 9 illustrates a completion of the countdown timer according to an example embodiment.

Responsive to input of the cooking parameters shown in the updated indicator ribbon 400, the cooking controller 40 may select an instruction set from the cooking signature for the indicated food product category 410 that corresponds to the other indicated cooking parameters. An indicator of the total estimated cook time (e.g., countdown timer 450) may then be presented to count down the time indicated until cooking according to the instructions associated with the cooking signature are complete. FIG. 9 illustrates a completion of the countdown timer 450. It should be appreciated that the countdown timer 450 may operate based on an assessment of the time it will take to achieve a total needed energy level delivered to the food product to achieve the desired doneness level for the corresponding food product. Thus, an energy countdown could be provided as an alternative, or a time of completion may be displayed rather than a countdown timer.

Of note, if any one of the tiles in the updated indicator ribbon 400 is selected, a corresponding entry page for the selected tile may be presented to allow the operator to modify the corresponding cooking parameter associated with the selected tile. Responsive to any changes made, the cooking controller 40 may be configured to determine whether the changes made require a different set of instructions to be executed from the cooking signature. RF energy delivery, air speed and/or air temperature control may then be instituted according to any instruction set changes necessitated by the changed cooking parameters in accordance with the cooking signature for the food product category 410.

Figure 10:
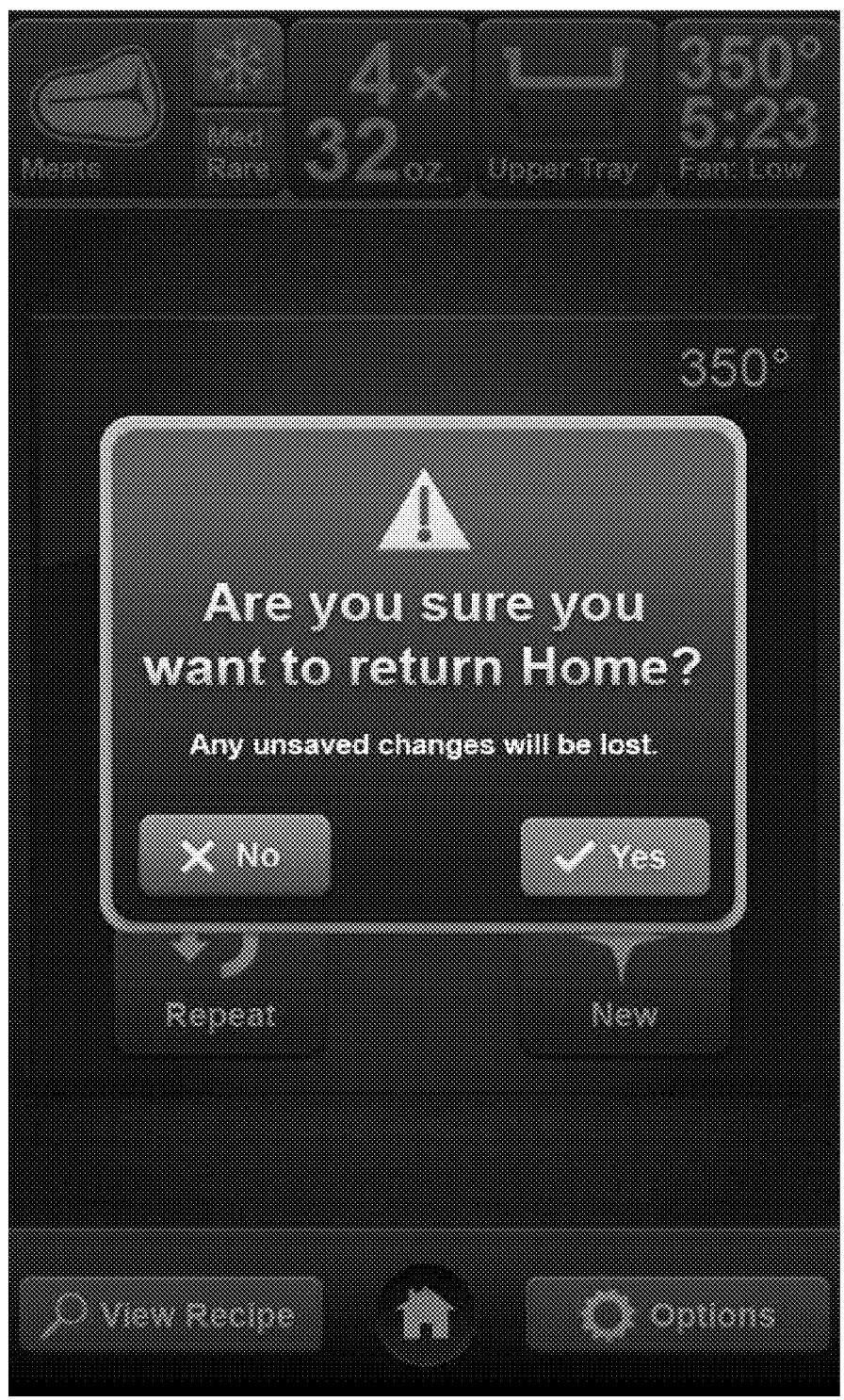
FIG. 10 illustrates one example of a control console presentable during a finishing sequence responsive to selection of a home button according to an example embodiment.

Furthermore, when the cooking cycle is complete, as shown in FIG. 9, the operator may be prompted to either repeat the cooking process just completed (e.g., via selection of repeat button 500, or to select a new cooking signature by entry of new cooking parameters (e.g., via selection of the new button 510). Other presentable options may include an option to view the current recipe 520, which may present the selected cooking parameters, and an option button 530 that may present other options to the operator. A home button 540 may also be presented and the selection of the home button 540 may cause the operator to be prompted as to whether to return home without saving any changes to the recipe as shown in FIG. 10.

Figure 11:
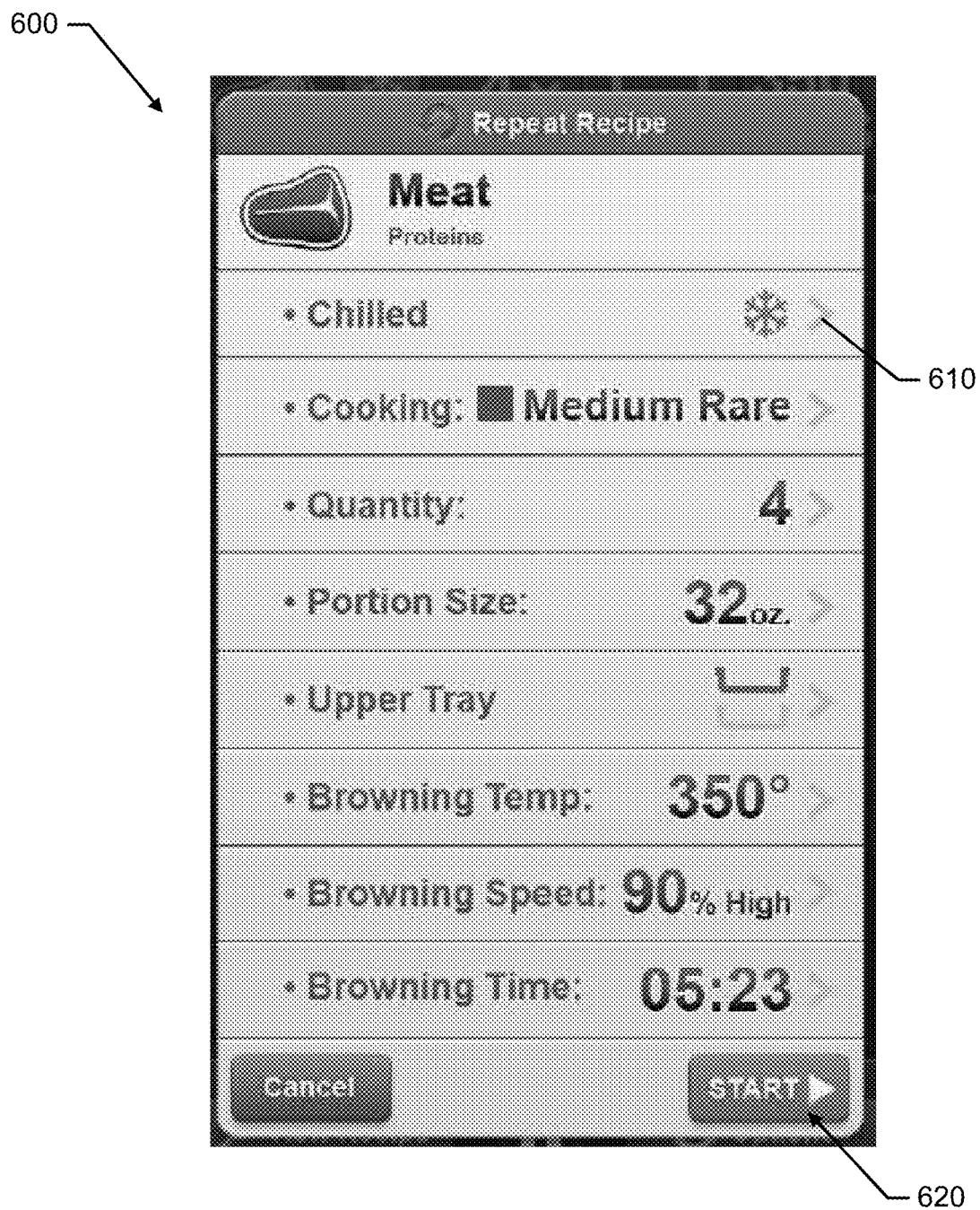
FIG. 11 illustrates one example of a control console presentable during a finishing sequence responsive to selection of a repeat recipe button according to an example embodiment.

In response to selection of the repeat button 500, a recipe summary page 600 may be presented as shown in FIG. 11. The recipe summary page 600 may show all of the cooking parameters associated with the prior recipe on a single page and enable the operator to select any one of the cooking parameters to make adjustments thereto. In this regard, for example, selectable indicators 610 may be provided proximate to each cooking parameter to permit adjustment of the corresponding cooking parameter. Responsive to any changes made and accepted by starting the cooking process (e.g., via selecting start button 620), the cooking controller 40 may determine which instruction sets to execute from the cooking signature associated with the selected food product or food product category.

Figure 12:
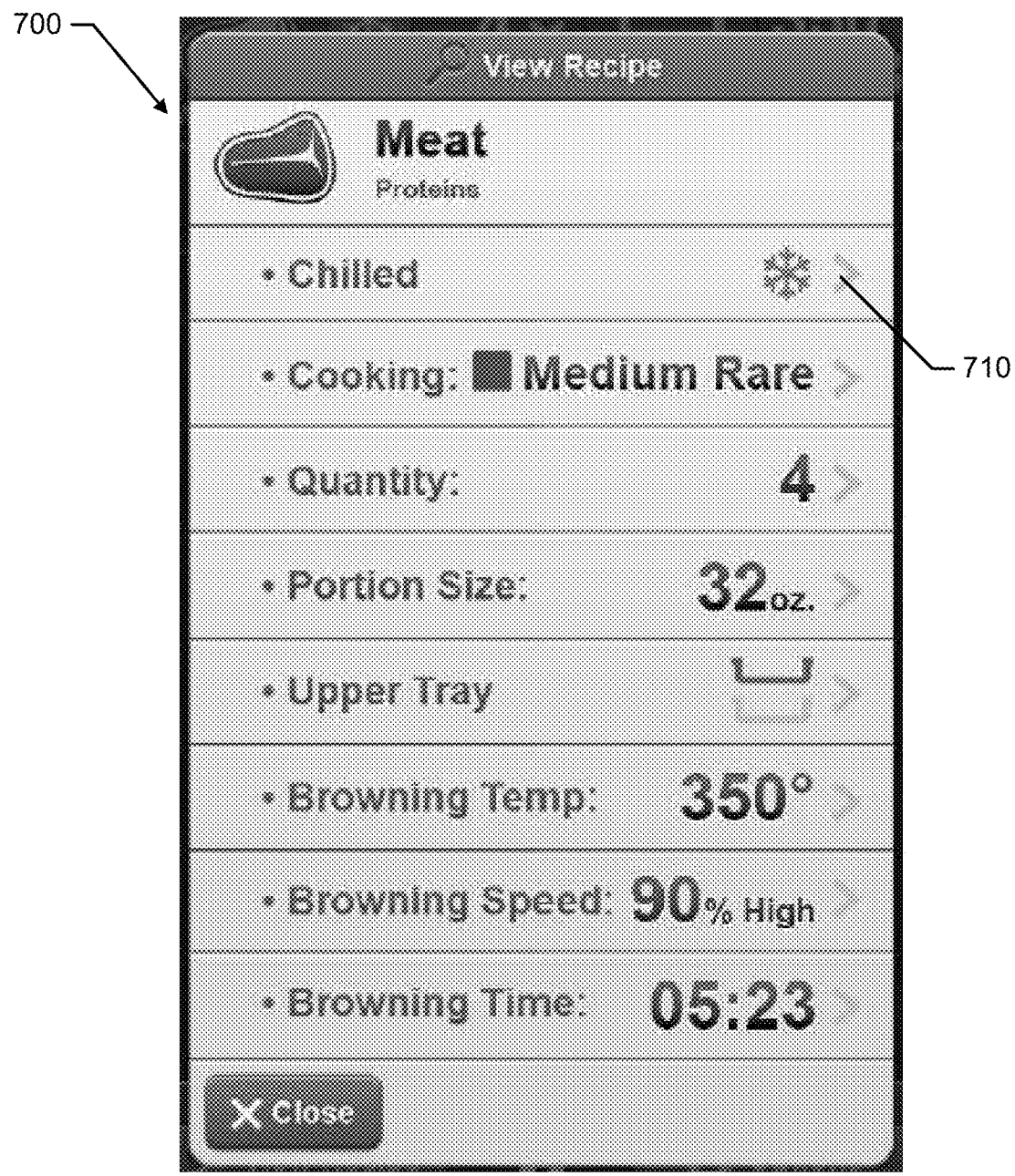
FIG. 12 illustrates one example of a control console presentable during a finishing sequence responsive to selection of a view recipe button according to an example embodiment.

In response to selection of the button corresponding to the current recipe 510, a current recipe page 700 may be displayed as shown on FIG. 12. The current recipe page 700 may show all cooking parameters associated with the current recipe and enable the operator to select any one of the cooking parameters to make adjustments thereto. In this regard, for example, selectable indicators 710 may be provided proximate to each cooking parameter to permit adjustment of the corresponding cooking parameter. Responsive to any changes made, the cooking controller 40 may determine which instruction sets to execute from the cooking signature associated with the selected food product or food product category.

Figure 13:
FIG. 13 illustrates one example of a control console presentable during a finishing sequence responsive to selection of an options button according to an example embodiment.
Figure 14:
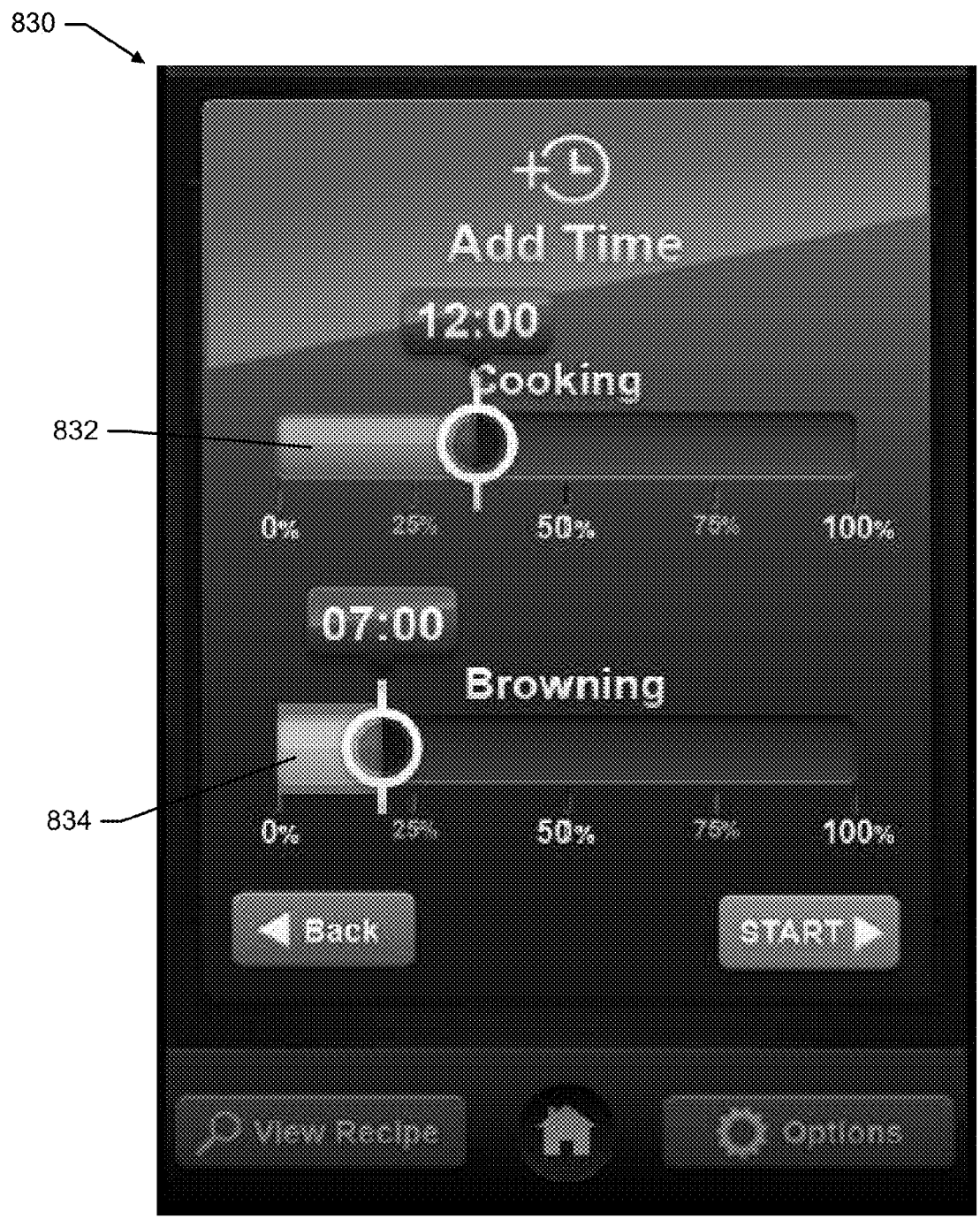
FIG. 14 illustrates one example of a control console presentable during a finishing sequence responsive to selection of an option to add time to a cooking sequence according to an example embodiment.
Figure 15:
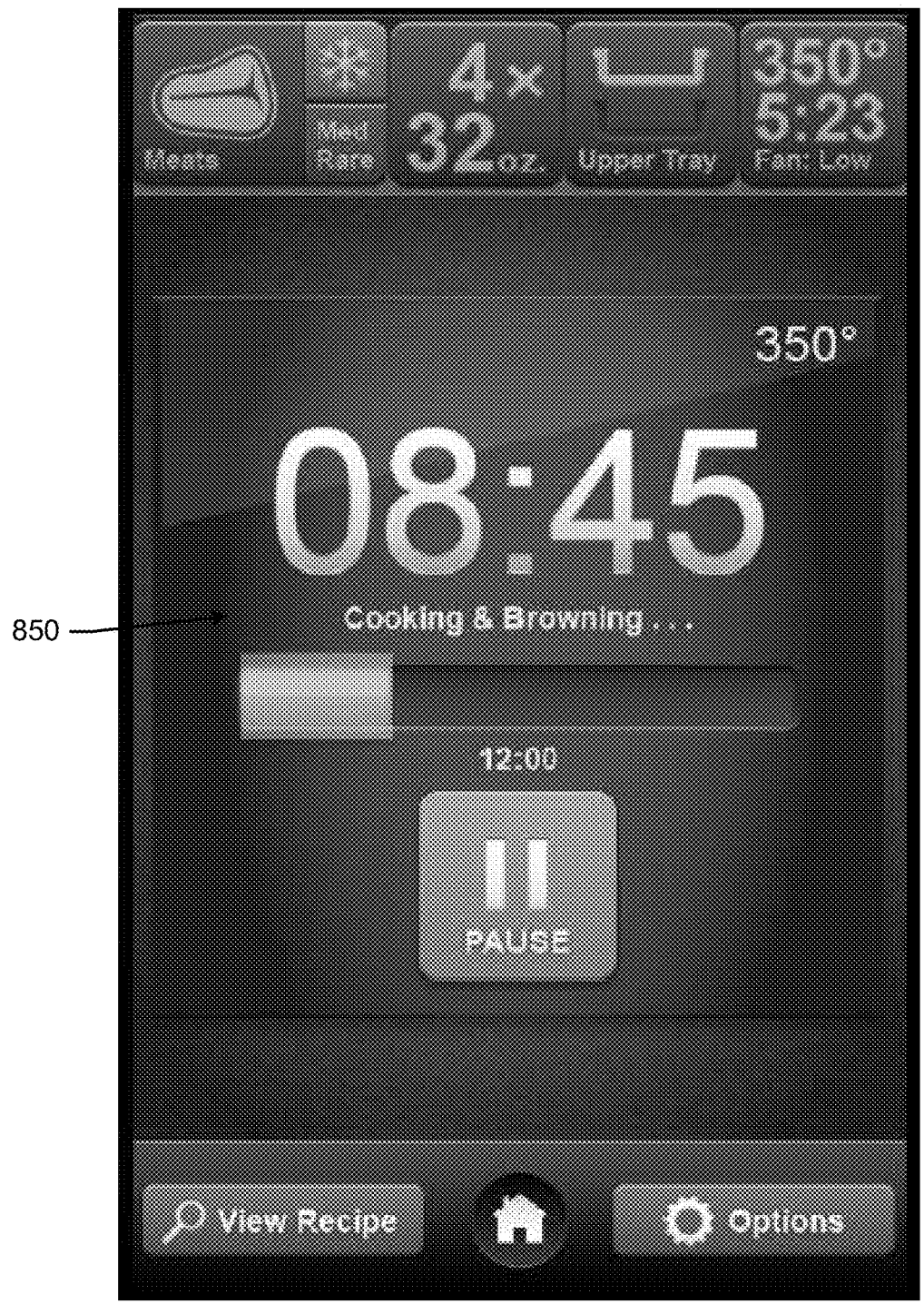
FIG. 15 illustrates one example of a control console presentable during a finishing sequence responsive to selection of additional cooking or browning time according to an example embodiment.

In an example embodiment, selection of the option button 530 may result in presentation of a control console 800 that enables the user to add more time to the cooking process by selecting an add time button 810 and/or to save the program just completed as a recipe by selecting a save button 820 as shown in FIG. 13. In an example embodiment, selection of the add time button 810 may launch a time addition control console 830 for enabling selection of additional browning time and/or cooking time according to an example embodiment as shown in FIG. 14. As shown in FIG. 14, the operator may select to turn on additional cooking and/or browning via a cooking selector 832 and/or a browning selector 834, which may direct additional operation of the first and second energy sources, respectively. Thus, the operator may slide a controller to increase cooking time and browning time independently of one another. As the operator slides each respective controller, the additional time selected for the application of the corresponding energy source may be presented. In some cases, the additional time may be selected as a percentage of the initial time selected for application of the corresponding energy source. The operator may then select a start button to initiate the addition of energy based on the selections made in the enabled control console 830. The cooking controller 40 may then be configured to determine any needed changes to the instruction set associated with the cooking signature for the corresponding food product or food product category in order to account for the change made by providing additional browning related energy. As such, the cooking controller 40 may dynamically respond to any changes to the cooking parameters that are made either before, during or after a cooking sequence is conducted. The dynamic response may include selection of a different instruction set if the instruction set mapped to the corresponding cooking parameters requires such a selection. An updated or new countdown timer 850 may then be presented to countdown the time added to the cooking sequence as shown in FIG. 15.

Figure 16:
FIG. 16 illustrates an example of a control console for saving a recipe according to an example embodiment.

If the operator selects the save button 820 on FIG. 13, a save recipe control console 860 may be provided as shown on FIG. 16. The save recipe control console 860 may include a general description of the food product (or food product category) and the cooking parameters associated with the given recipe. A nickname may also be provided. The operator may enter a recipe name and/or nickname using a keyboard 862. The recipe may be saved by pressing the save button 864. A list of all saved recipes may be provide in the word index 866 and notes corresponding to any particular recipe may be added by selecting the add notes button 868 when a specific recipe is opened.

Figure 17:
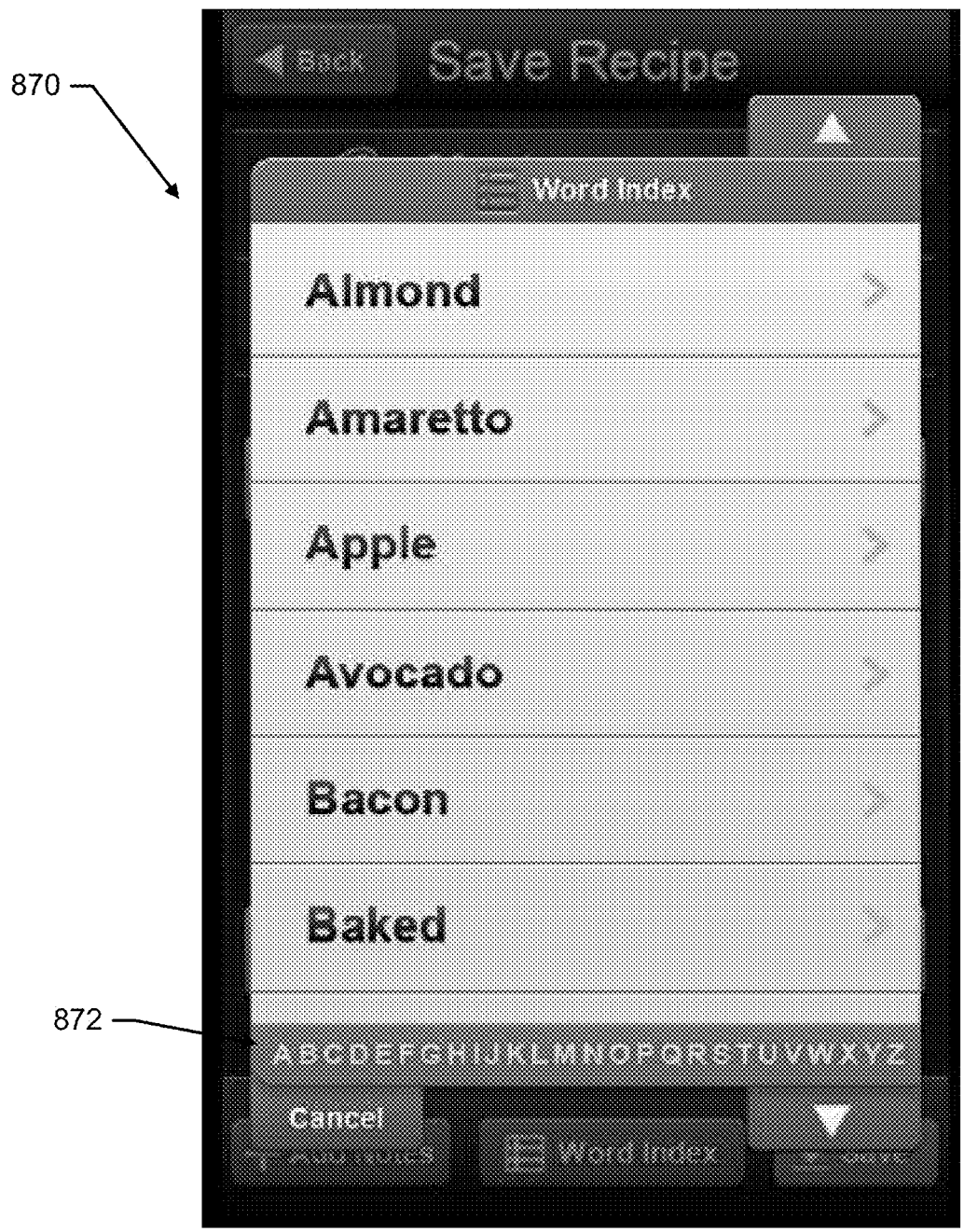
FIG. 17 illustrates an alphabetical listing of saved recipes according to an example embodiment.
Figure 18:
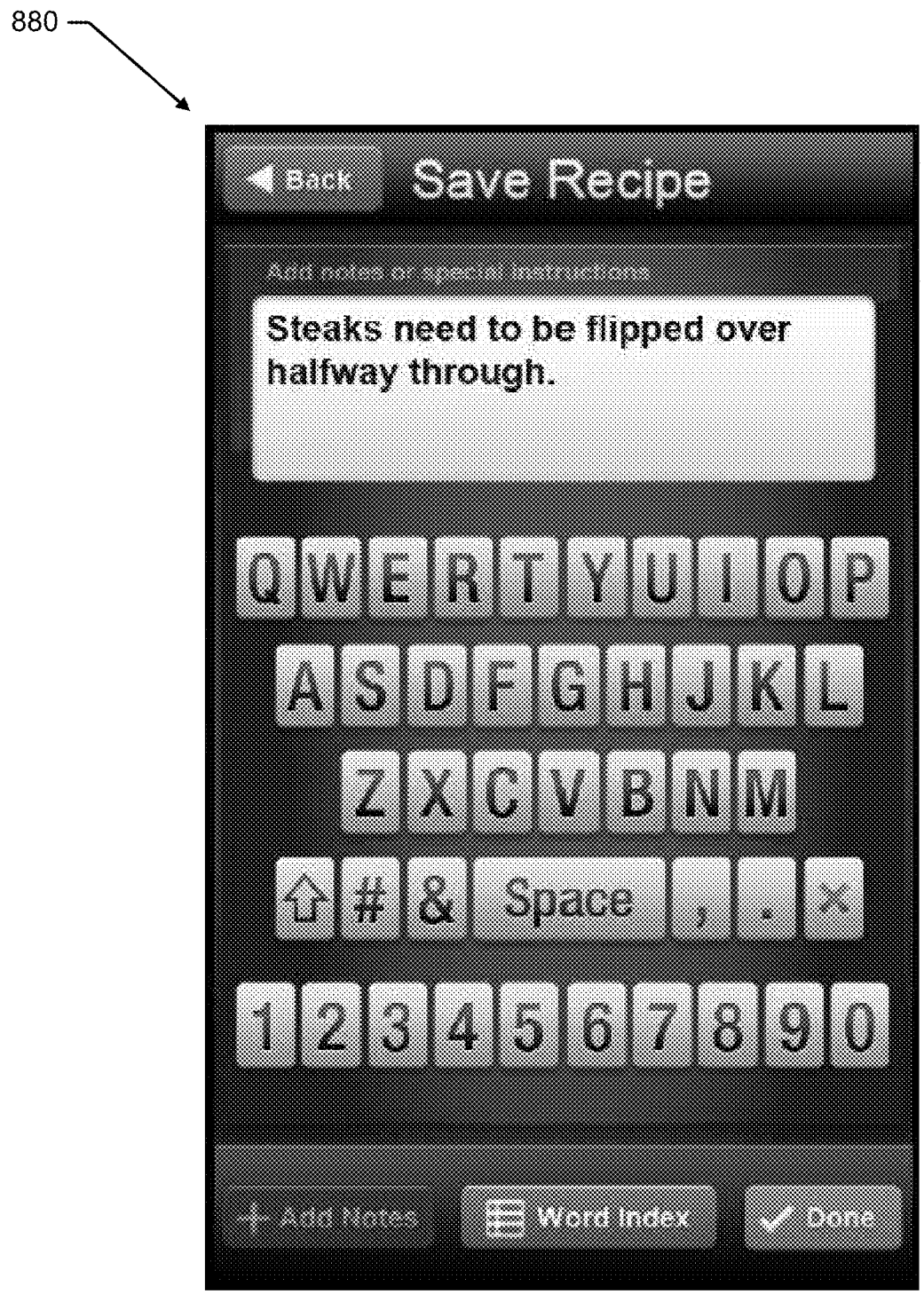
FIG. 18 illustrates a notes page for entering notes according to an example embodiment.

In some embodiments, responsive to selection of the word index 866, an alphabetical listing of saved recipes 870 may be provided as shown in FIG. 17. Selection of any one of the recipes from the word index may then call up details on the corresponding recipe (e.g., similar to the details in FIGS. 11 and 12). Since the recipes are listed in alphabetical order, recipes associated with a particular first letter may be accessed by selecting a corresponding letter from the alphabetical shortcut bar 872. If the operator selects the notes button 868, a notes page 880 may be provided along with a keyboard to enter in the corresponding notes as shown in FIG. 18. The notes may then be saved in association with the corresponding recipe.

Figure 19:
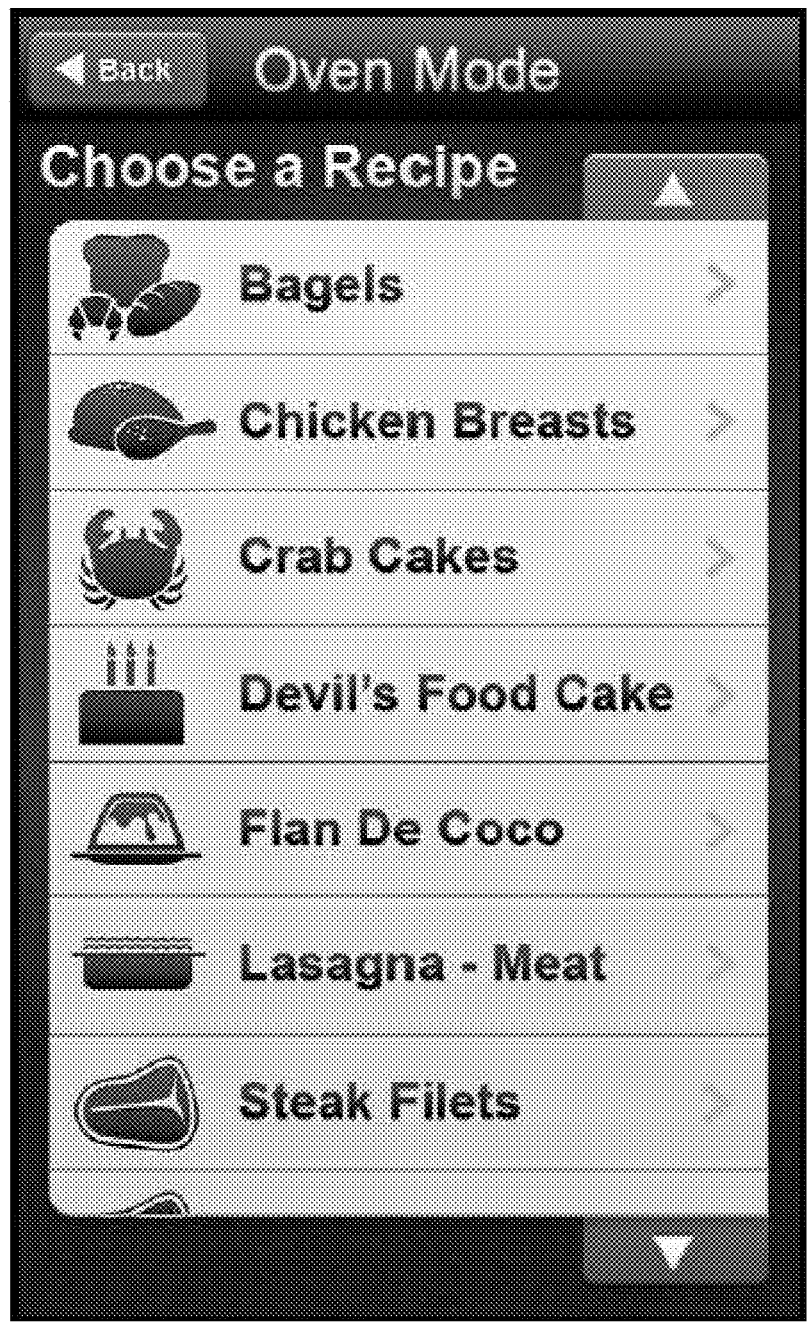
FIG. 19 illustrates an alphabetical list of recipes according to an example embodiment.
Figure 20:
FIG. 20 illustrate a notes popup according to an example embodiment.

In the oven mode, recipes may be presented in an alphabetical list as shown in FIG. 19. Selection of a recipe may then provide some of the cooking parameters that correlate to the selected recipe. If notes are saved in association with the recipe, a notes popup 890 may appear as shown in FIG. 20. The recipes may therefore correlate to certain combinations of cooking parameters. Meanwhile, a cooking signature may include information associated with multiple combinations of cooking parameters with corresponding mappings to instruction sets useable by the cooking controller 40 to undertake cooking sequences defined by relevant instruction sets. In some cases, the cooking signature may also include notes that correspond to any particular instruction set. The notes may define specific relevant activities to be performed in association with a recipe and/or may include supplemental information such as ingredient listings, potential substitutions and/or the like.

Figure 21:
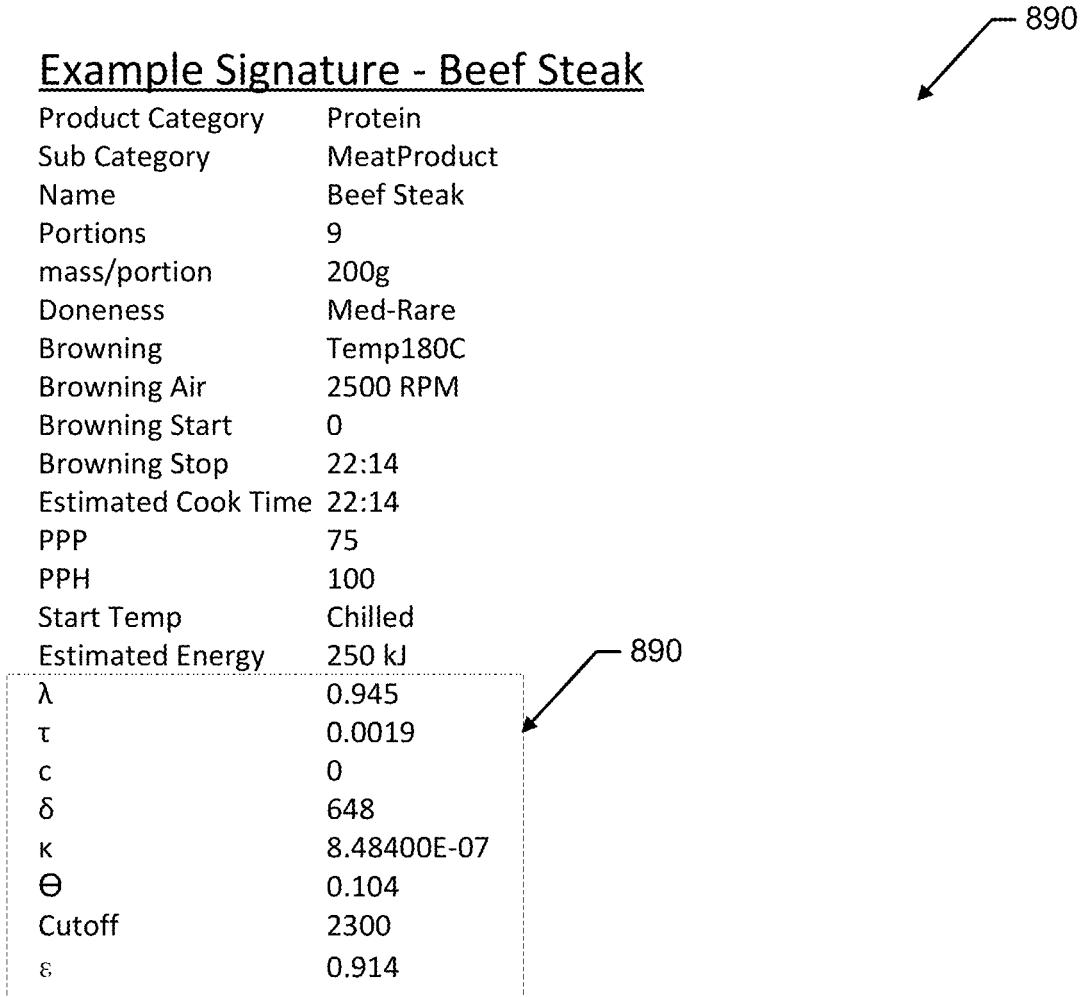
FIG. 21 illustrates an example cooking signature for beef steak according to an example embodiment.

Accordingly, the cooking signature of an example embodiment may include inherent properties (e.g., parameters unique to RF absorption, density, moisture content, and/or the like) and input response properties that define instruction sets that tailor the actual cooking time to the food product being cooked based on the circumstances defined by the user. As such, the cooking signature enables accurate estimates to be generated with respect to the cooking time needed for a food product (and other cooking parameters) defined by user inputs. FIGS. 21-25 illustrate some examples of cooking signatures according to some example embodiments. In this regard, FIG. 21 illustrates an example cooking signature for beef steak. In addition to some descriptive information that may be typical of a recipe (e.g., product name/characteristics, browning details, cooking estimates, and/or the like), the signature 890 may include inherent property parameters 891. These inherent parameters are merely exemplary, but may include values indicative of RF absorption characteristics, heat capacity, density, moisture content, and/or the like. FIG. 22 illustrates an example cooking signature 892 for chicken breast with corresponding inherent property parameters 893. FIG. 23 illustrates an example cooking signature 894 for bread with corresponding inherent property parameters 895. FIG. 24, which includes FIGS. 24A, 24B and 24C illustrates an example detailed table providing values for computations utilized in connection with signature cooking according to an example embodiment. FIG. 25 illustrates an example of modifications performed based on one inherent parameter ($\delta$) that may be provided for different food product types and initial conditions.

FIG. 26 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., oven 10) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 26, may include receiving an indication of cooking parameters entered by an operator of the oven where the cooking parameters define at least a food product category of the food product at operation 900. The method may further include selecting, e.g., via processing circuitry associated with a cooking controller operably coupled to the first and second energy sources, a cooking signature corresponding to the food product category at operation 910. The cooking signature may include information descriptive of inherent properties of the food product category and input response properties defining one or more sets of instructions associated with a cooking sequence for the food product based on the cooking parameters.

In an example embodiment, an apparatus for performing the method of FIG. 26 above may comprise a processor (e.g., the processor 110) configured to perform some or each of the operations (900-910) described above. The processor may, for example, be configured to perform the operations (900-910) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber configured to receive a food product;
a user interface configured to display information associated with processes employed for cooking the food product;
a first energy source providing primary heating of the food product placed in the cooking chamber;
a second energy source providing secondary heating for the food product; and
a cooking controller operably coupled to the first and second energy sources to execute instructions directing application of energy to the food product via at least one of the first or second energy sources, the cooking controller including processing circuitry configured to:
  receive an indication of cooking parameters entered by an operator of the oven, the cooking parameters defining at least a food product category of the food product and defining an initial state and desired final state of the food product;
  select a cooking signature corresponding to the food product category, the cooking signature including information descriptive of inherent RF absorption properties of the food product category and input response properties defining one or more sets of instructions associated with a cooking sequence for the food product to achieve the desired final state based on the initial state and the inherent RF absorption properties, the one or more sets of instructions being dynamically selectable for execution from instructions associated with the cooking signature based on the cooking parameters and the information descriptive of the inherent RF absorption properties,
  receive an indication of operator inserted changes to the cooking parameters during execution of the instructions associated with the cooking signature, and
  change the instructions associated with the cooking signature based on the operated inserted changes to the cooking parameters.

2. The oven of claim 1, wherein the cooking parameters represent initial conditions entered by the operator prior to commencing the cooking sequence.

3. The oven of claim 1, wherein the cooking parameters represent dynamically changed conditions entered by the operator during the cooking sequence or after completion of the cooking sequence.

4. The oven of claim 1, wherein the cooking signature further comprises supplemental information including, operator notes, an ingredient listing, or potential substitutions.

5. The oven of claim 1, wherein selecting the cooking signature comprises selecting instructions from a library of instruction sets associated with the cooking signature based on a mapping of cooking parameter combinations to corresponding instructions.

6. The oven of claim 1, wherein selecting the cooking signature comprises selecting instructions defining radio frequency (RF) heating characteristics to be used in connection with defined air temperature and air speed characteristics.

7. The oven of claim 1, wherein the cooking parameters include the food product category and one or more of an initial state of the food product, a final desired state of the food product, an indication of mass of the food product, and a location of the food product within the oven.

8. A cooking controller for use in an oven including a first energy source providing primary heating of a food product placed in the oven and a second energy source providing secondary heating for the food product, the cooking controller operably coupled to the first and second energy sources to execute instructions associated with a cooking program directing application of energy to the food product via at least one of the first or second energy sources for a program cooking time and comprising processing circuitry configured to:

receive an indication of cooking parameters entered by an operator of the oven, the cooking parameters defining at least a food product category of the food product and defining an initial state and desired final state of the food product;

select a cooking signature corresponding to the food product category, the cooking signature including information descriptive of inherent RF absorption properties of the food product category and input response properties defining one or more sets of instructions associated with a cooking sequence for the food product to achieve the desired final state based on the initial state and the inherent RF absorption properties, the one or more sets of instructions being dynamically selectable for execution from instructions associated with the cooking signature based on the cooking parameters and the information descriptive of the inherent RF absorption properties, receive an indication of operator inserted changes to the cooking parameters during execution of the instructions associated with the cooking signature, and change the instructions associated with the cooking signature based on the operated inserted changes to the cooking parameters.

9. The cooking controller of claim 8, wherein the cooking parameters represent initial conditions entered by the operator prior to commencing the cooking sequence.

10. The cooking controller of claim 8, wherein the cooking parameters represent dynamically changed conditions entered by the operator during the cooking sequence or after completion of the cooking sequence.

11. The cooking controller of claim 8, wherein the cooking signature further comprises supplemental information including, operator notes, an ingredient listing, or potential substitutions.

12. The cooking controller of claim 8, wherein selecting the cooking signature comprises selecting instructions from a library of instruction sets associated with the cooking signature based on a mapping of cooking parameter combinations to corresponding instructions.

13. The cooking controller of claim 8, wherein selecting the cooking signature comprises selecting instructions defining radio frequency (RF) heating characteristics to be used in connection with defined air temperature and air speed characteristics.

14. The cooking controller of claim 8, wherein the cooking parameters include the food product category and one or more of an initial state of the food product, a final desired state of the food product, an indication of mass of the food product, and a location of the food product within the oven.

15. A method of controlling an oven including a first energy source providing primary heating of a food product placed in the oven and a second energy source providing secondary heating for the food product, the method comprising:

receiving an indication of cooking parameters entered by an operator of the oven, the cooking parameters defining at least a food product category of the food product and defining an initial state and desired final state of the food product; and selecting, via processing circuitry associated with a cooking controller operably coupled to the first and second energy sources, a cooking signature corresponding to the food product category, the cooking signature including information descriptive of inherent RF absorption properties of the food product category and input response properties defining one or more sets of instructions associated with a cooking sequence for the food product to achieve the desired final state based on the initial state and the inherent RF absorption properties, the one or more sets of instructions being dynamically selectable for execution from instructions associated with the cooking signature based on the cooking parameters and the information descriptive of the inherent RF absorption properties, receiving an indication of operator inserted changes to the cooking parameters during execution of the instructions associated with the cooking signature, and changing the instructions associated with the cooking signature based on the operated inserted changes to the cooking parameters.

16. The method of claim 15, wherein the cooking parameters represent initial conditions entered by an operator prior to commencing the cooking sequence.

17. The method of claim 15, wherein the cooking parameters represent dynamically changed conditions entered by the operator during or after completion of the cooking sequence.

18. The method of claim 15, wherein selecting the cooking signature comprises selecting instructions from a library of instruction sets associated with the cooking signature based on a mapping of cooking parameter combinations to corresponding instructions.

19. The method of claim 15, wherein selecting the cooking signature comprises selecting instructions defining radio frequency (RF) heating characteristics to be used in connection with defined air temperature and air speed characteristics.

20. The method of claim 15, wherein the cooking parameters include the food product category and one or more of an initial state of the food product, a final desired state of the food product, an indication of mass of the food product, and a location of the food product within the oven.

* * * * *

UNITED STATES PATENT AND TRADEMARK OFFICE
CERTIFICATE OF CORRECTION

PATENT NO. : 9,182,126 B2
APPLICATION NO. : 13/274624
DATED : November 10, 2015
INVENTOR(S) : Richard W. Cartwright and Richard A. Kice It is certified that error appears in the above-identified patent and that said Letters Patent is hereby corrected as shown below:

Column 18, Claim 1, Line 36 "signature based on the operated inserted changes to the" should read --signature based on the operator inserted changes to the--.

Column 19, Claim 8, Line 26 "signature based on the operated inserted changes to the cook" should read --signature based on the operator inserted changes to the cook--.

Column 20, Claim 15, Line 29 "signature based on the operated inserted changes to the" should read --signature based on the operator inserted changes to the--.

Signed and Sealed this
Twelfth Day of July, 2016

Michelle K. Lee
*Director of the United States Patent and Trademark Office*